United States Patent
Motokura et al.

(10) Patent No.: US 11,491,397 B2
(45) Date of Patent: Nov. 8, 2022

(54) NON-TRANSITORY COMPUTER-READABLE STORAGE MEDIUM HAVING STORED THEREIN GAME PROGRAM, GAME SYSTEM, INFORMATION PROCESSING APPARATUS, AND INFORMATION PROCESSING METHOD

(71) Applicant: NINTENDO CO., LTD., Kyoto (JP)

(72) Inventors: Kenta Motokura, Kyoto (JP); Shinya Hiratake, Kyoto (JP); Katsuyasu Ando, Kyoto (JP); Jonathan Johnson, Redmond, WA (US); Brandon Dulyea, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/004,505

(22) Filed: Aug. 27, 2020

(65) Prior Publication Data
US 2022/0062760 A1    Mar. 3, 2022

(51) Int. Cl.
*A63F 13/42*    (2014.01)
*A63F 13/211*   (2014.01)
*A63F 13/214*   (2014.01)

(52) U.S. Cl.
CPC ............ *A63F 13/42* (2014.09); *A63F 13/211* (2014.09); *A63F 13/214* (2014.09)

(58) Field of Classification Search
None
See application file for complete search history.

(56) References Cited

U.S. PATENT DOCUMENTS

| | | | |
|---|---|---|---|
| 9,703,369 B1* | 7/2017 | Mullen | A63F 13/843 |
| 11,123,637 B2* | 9/2021 | Laatikainen | A63F 13/335 |
| 2006/0116186 A1* | 6/2006 | Sawada | G04D 3/0048 463/4 |

(Continued)

FOREIGN PATENT DOCUMENTS

| | | |
|---|---|---|
| JP | 2006-55616 | 3/2006 |
| JP | 2010-155055 | 7/2010 |

(Continued)

OTHER PUBLICATIONS

"[Luigi's Mansion 3] How to play with 2 people! To play a story with 2 people", Minnaisshonizenshin Blog [online], May 17, 2020, <https://mini4blog.xyz/luigi-mansion3-how-to-play-two-people/>, [searched on Apr. 20, 2022].

(Continued)

*Primary Examiner* — James S. McClellan
*Assistant Examiner* — Peter J Iannuzzi
(74) *Attorney, Agent, or Firm* — Nixon & Vanderhye, PC

(57) ABSTRACT

In a first mode, based on an operation input to a controller of a first player, a game system controls a first character object and controls a pointer object. In the first mode, the game system automatically controls a second character object and causes the second character object to perform a predetermined action on a position in a virtual space indicated by the pointer object. In a second mode, the game system controls the first character object based on the operation input to the controller of the first player and controls the second character object based on an operation input to a controller of a second player.

22 Claims, 17 Drawing Sheets

(56) References Cited

U.S. PATENT DOCUMENTS

| | | | | |
|---|---|---|---|---|
| 2008/0256015 A1* | 10/2008 | Woolf | ................ | A63F 13/80 |
| | | | | 706/48 |
| 2013/0331182 A1 | 12/2013 | Tanzawa | | |
| 2015/0080123 A1 | 3/2015 | Motokura et al. | | |
| 2015/0246286 A1* | 9/2015 | Branson | ................ | A63F 13/424 |
| | | | | 463/31 |
| 2018/0036642 A1 | 2/2018 | Tanaka | | |

FOREIGN PATENT DOCUMENTS

| | | |
|---|---|---|
| JP | 2013-255607 | 12/2013 |
| JP | 2014-529792 | 11/2014 |
| JP | 2018-19894 | 2/2018 |
| JP | 2020-32233 | 3/2020 |
| JP | 6687994 | 4/2020 |
| WO | 2013/026048 | 2/2013 |

OTHER PUBLICATIONS

Notice of Reasons for Refusal dated May 6, 2022 in Japanese Patent Application No. 2020-146669 with English machine translation, 9 pages.

\* cited by examiner

FIG. 8
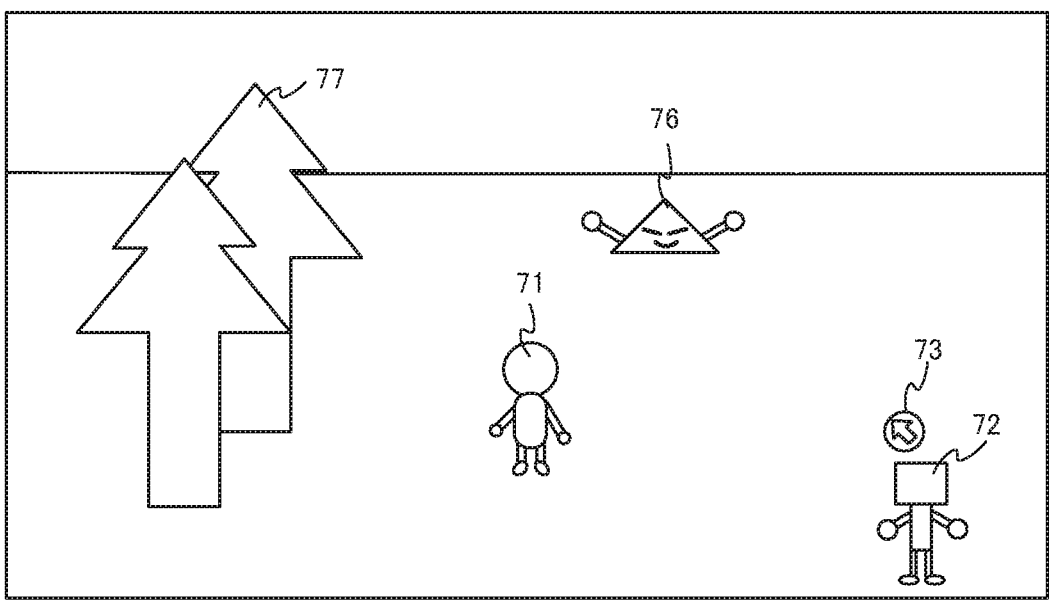
FIRST MODE
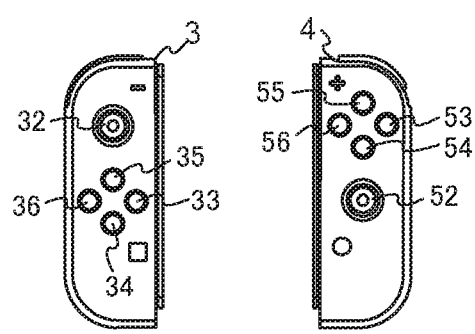
FIRST PLAYER

FIRST MODE

FIRST MODE

FIG. 17
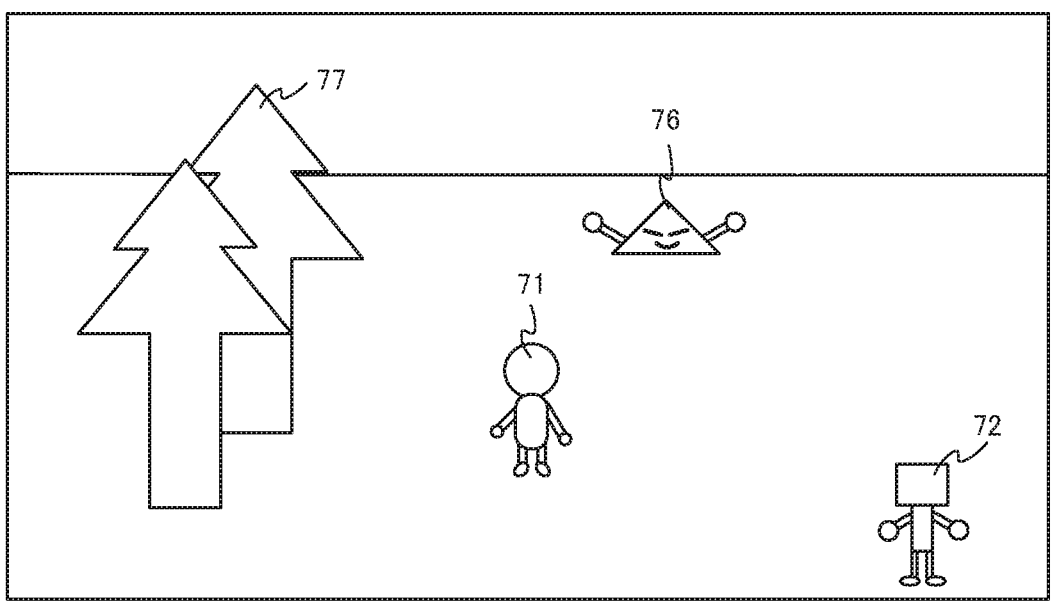
SECOND MODE
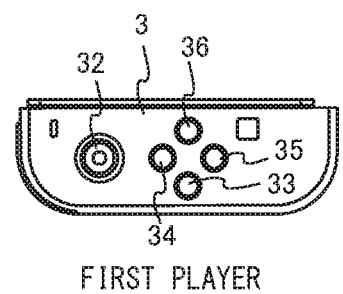
FIRST PLAYER
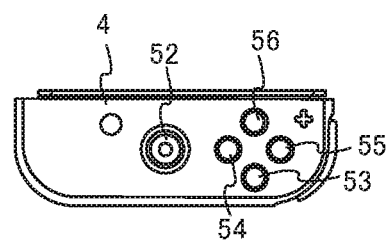
SECOND PLAYER

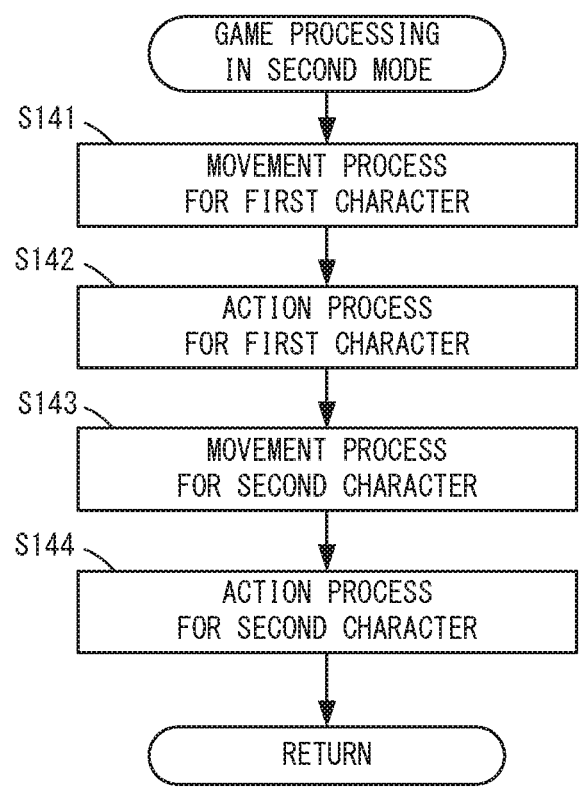

NON-TRANSITORY COMPUTER-READABLE STORAGE MEDIUM HAVING STORED THEREIN GAME PROGRAM, GAME SYSTEM, INFORMATION PROCESSING APPARATUS, AND INFORMATION PROCESSING METHOD

FIELD

The present disclosure relates to a non-transitory computer-readable storage medium having stored therein a game program, a game system, an information processing apparatus, and an information processing method that are capable of performing a game using a plurality of characters.

BACKGROUND AND SUMMARY

There is a game where a plurality of players operate a plurality of characters of theirs in a virtual space.

In the above game, however, the respective players operate different characters, and there is room for improvement in a method in which a single player or a plurality of players control a plurality of characters.

Therefore, it is an object of an exemplary embodiment to provide a novel technique in which both a single player and a plurality of players can control a plurality of characters.

To achieve the above object, the exemplary embodiment employs the following configurations.

The exemplary embodiment is a game system comprising at least one processor that performs information processing based on an operation input assigned to each player. The processor, in a first mode where a game is played based on an operation input assigned to a first player, based on the operation input assigned to the first player, controls a first character object in a virtual space and control a pointer displayed on a game screen, and in the virtual space, automatically controls a second character object in accordance with a situation in the virtual space and cause the second character object to perform a predetermined action on a position in the virtual space indicated by the pointer. Further, the processor, in a second mode where the game is played based on the operation input assigned to the first player and an operation input assigned to a second player, based on the operation input assigned to the first player, controls the first character object in the virtual space, and based on the operation input assigned to the second player, controls the second character object in the virtual space.

According to the above configuration, in a first mode, a first player can control a first character object and control a pointer. In the first mode, a second character object is automatically controlled and performs a predetermined action on a position in a virtual space indicated by the pointer. Thus, in the first mode, the first player can control the first character object and cause the second character object to perform a predetermined action on a desired position. Further, in a second mode, the first player can control the first character object, and a second player can control the second character object. Consequently, it is possible to operate a plurality of character objects in both a one-player play mode and a multiplayer play mode and provide a novel game.

Further, the operation input assigned to the first player may include at least inertial data corresponding to an output from an inertial sensor. In the first mode, a position of the pointer may be controlled based on the inertial data.

According to the above configuration, based on inertial data from an inertial sensor, the position of the pointer can be controlled. Consequently, for example, the first player can control the position of the pointer by changing the orientation of an operation device including the inertial sensor.

Further, the operation input assigned to the first player may include at least touch data corresponding to an input to a touch panel. In the first mode, a position of the pointer may be controlled based on the touch data.

According to the above configuration, the position of the pointer can be controlled using a touch panel.

Further, the operation input assigned to the first player may include at least a first direction input, and the operation input assigned to the second player may include at least a second direction input. In the first mode, a movement of the first character object may be controlled based on the first direction input. In the second mode, the movement of the first character object may be controlled based on the first direction input, and a movement of the second character object is controlled based on the second direction input.

According to the above configuration, in the first mode, the first character object can be moved based on a first direction input. In the second mode, the first character object can be moved based on the first direction input, and the second character object can also be moved based on a second direction input. The movement of the first character object is controlled based on the first direction input in both the first mode and the second mode and thereby can be based on an operation easily understandable to the first player.

Further, in the first mode, if an object is present at the position in the virtual space indicated by the pointer, the second character object may perform the predetermined action on the object.

According to the above configuration, the second character object can be caused to perform a predetermined action on an object present in the virtual space.

Further, the second character object may perform an action that differs in accordance with a type of the object.

According to the above configuration, in accordance with the type of an object placed in the virtual space, the second character object can be caused to perform a different action.

Further, in the first mode, as the predetermined action, the second character object may move to the position in the virtual space indicated by the pointer.

According to the above configuration, the second character object can be moved to a position desired by the first player.

Further, in the first mode, in accordance with an instruction included in the operation input assigned to the first player, the second character object may perform the predetermined action.

According to the above configuration, the second character object can be caused to perform a predetermined action at a timing desired by the first player.

Further, in the first mode, the second character object may automatically move within a predetermined range in the virtual space in accordance with a position of the first character object, and in accordance with an instruction included in the operation input assigned to the first player, may perform the predetermined action on the position in the virtual space indicated by the pointer.

According to the above configuration, for example, the second character object can be automatically moved within a predetermined range including the position of the first character object and can also be caused to perform a predetermined action. Consequently, for example, the first player can limit the movement range of the second character object that is automatically controlled, to some extent and cause the second character object to perform a predetermined action at a desired timing.

The game system may further include a first operation device and a second operation device. In the first mode, the operation input assigned to the first player may be operation inputs to the first operation device and the second operation device. In the second mode, the operation input assigned to the first player may be an operation input to the first operation device, and the operation input assigned to the second player is an operation input to the second operation device.

According to the above configuration, in the first mode, the first player can perform a game using a first operation device and a second operation device. If a switch is made to the second mode, the first player can spare the second player the second operation device between the two operation devices and allow the second player to control the second character object using the second operation device.

The game system may further include a first operation device and a second operation device. In the first mode, the operation input assigned to the first player may be an operation input to the first operation device. In the second mode, the operation input assigned to the first player may be an operation input to the first operation device, and the operation input assigned to the second player is an operation input to the second operation device.

According to the above configuration, the first player can operate the first character object using a first operation device in the first mode, and can operate the same first character object using the same first operation device also in the second mode. Further, in the second mode, the second player can be allowed to control the second character object using a different second operation device.

Further, another exemplary embodiment may be an information processing apparatus that executes the above processing, a game program that causes a processor of an information processing apparatus to perform the above processing, or an information processing method performed by an information processing system.

According to the exemplary embodiment, it is possible to operate a plurality of character objects in both a one-player play mode and a multiplayer play mode.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 is an illustrative non-limiting diagram showing an example of a game screen when a first player performs a game in a first mode;

FIG. 17 is an illustrative non-limiting diagram showing an example of the game screen after the first mode is switched to a second mode in the state shown in FIG. 8;

FIG. 21 is an illustrative non-limiting flow chart showing an example of game processing in the second mode in step S108.

DETAILED DESCRIPTION OF NON-LIMITING EXAMPLE EMBODIMENTS (System Configuration)

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2).

Figure 1:
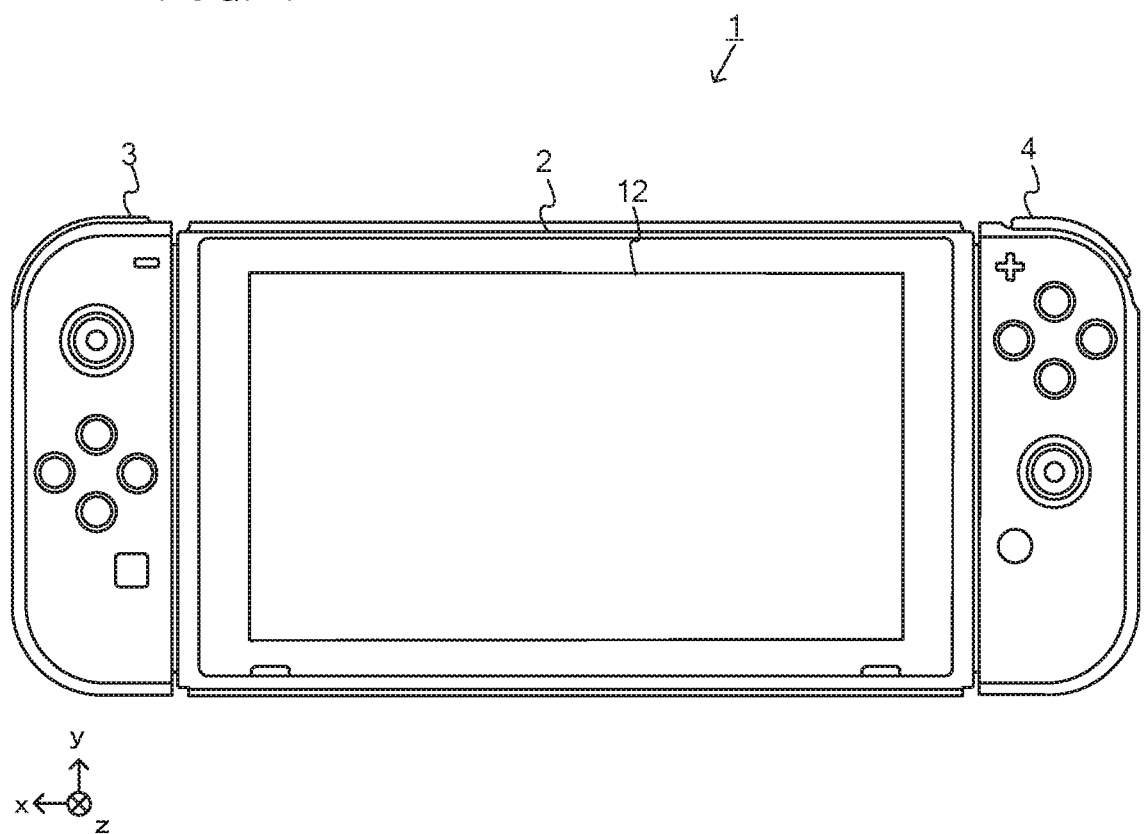
FIG. 1 is an illustrative non-limiting diagram showing the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. Each of the left controller 3 and the right controller 4 is an apparatus including operation sections with which a user provides inputs.

Figure 2:
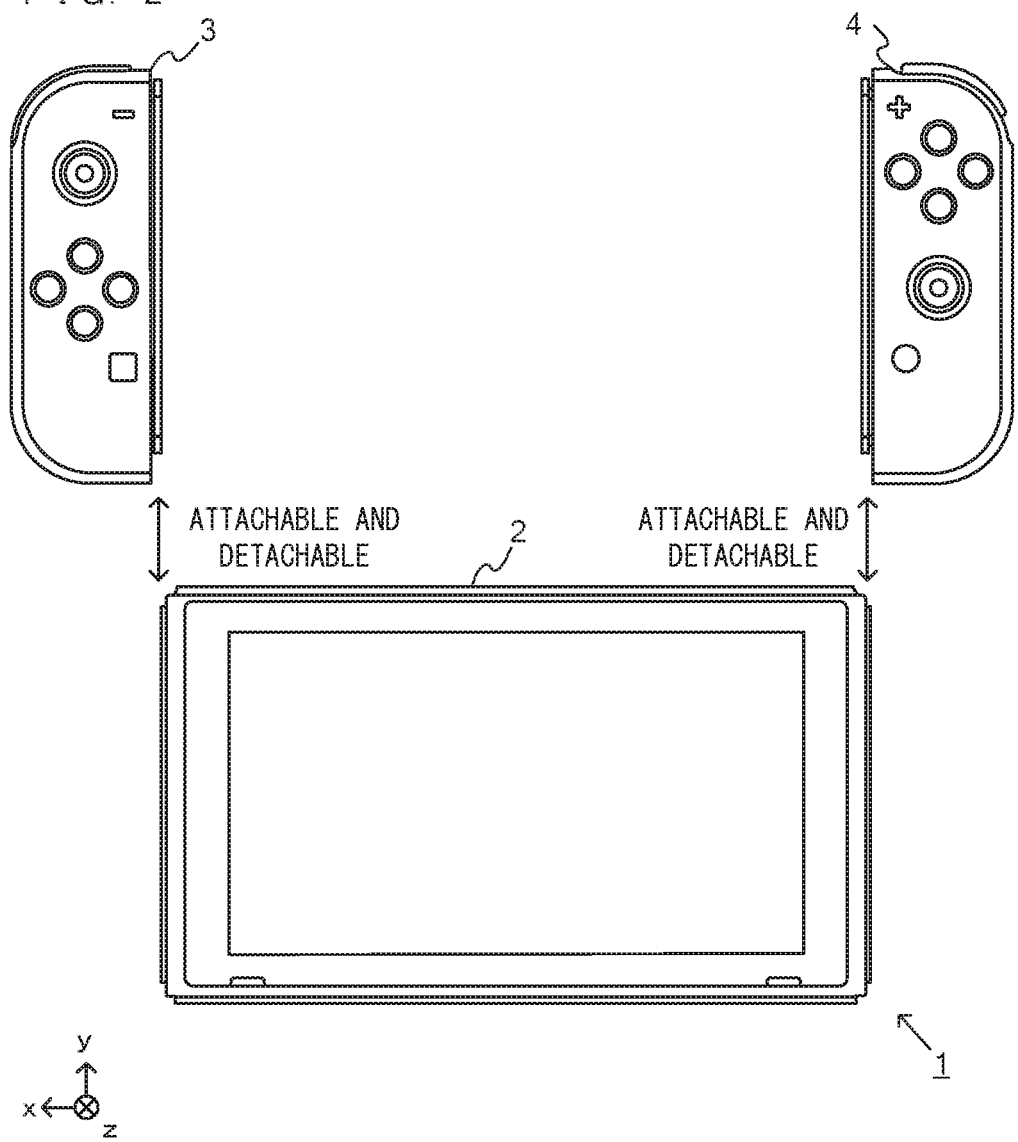
FIG. 2 is an illustrative non-limiting diagram showing an example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
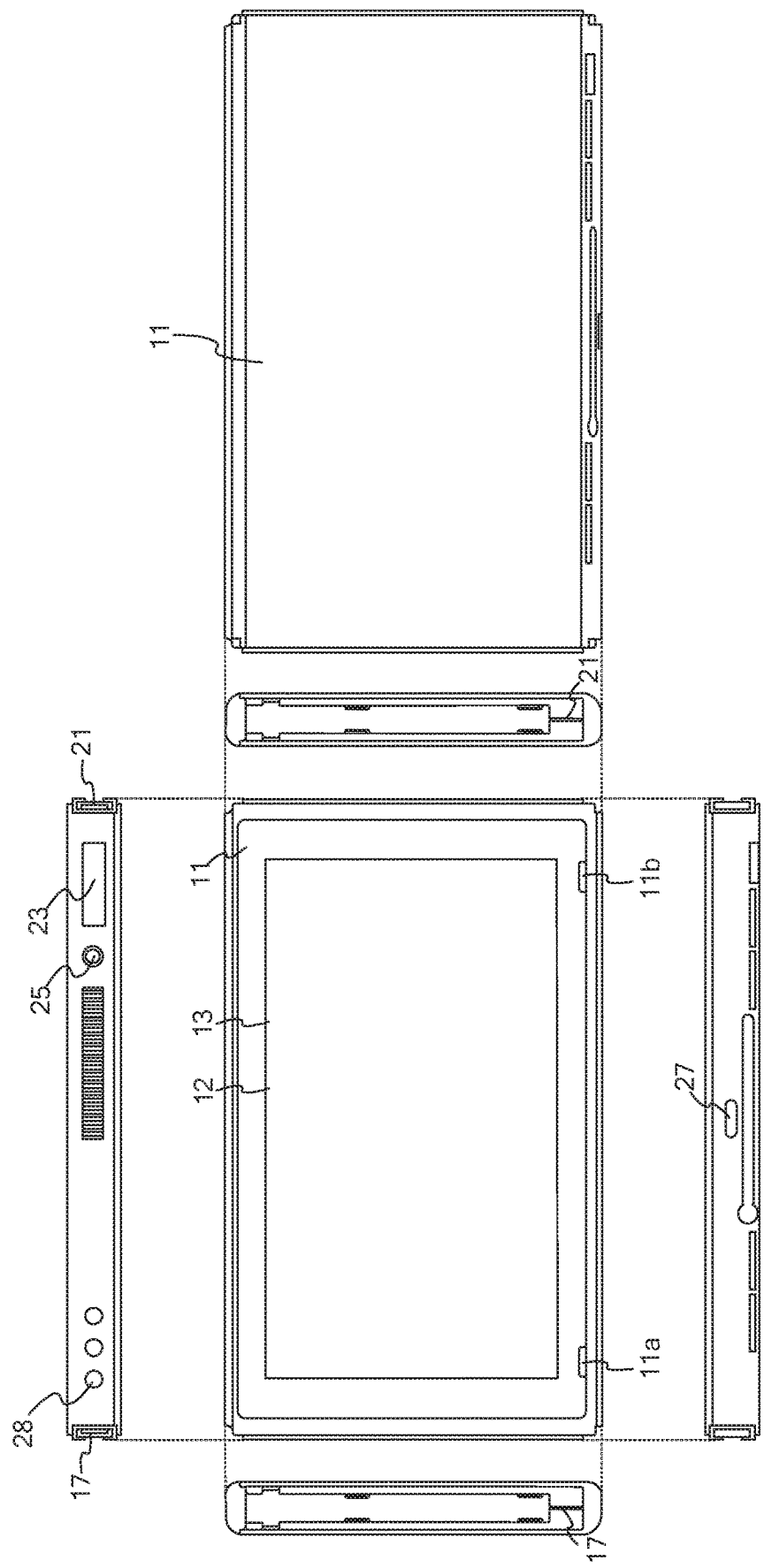
FIG. 3 is illustrative non-limiting six orthogonal views showing an example of the main body apparatus 2.

FIG. 3 is six orthogonal views showing an example of the main body apparatus 2. As shown in FIG. 3, the main body apparatus 2 includes an approximately plate-shaped housing 11.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1.

The main body apparatus 2 includes a lower terminal 27. The lower terminal 27 is a terminal for the main body apparatus 2 to communicate with a cradle. Further, when the unified apparatus or the main body apparatus 2 alone is mounted on the cradle, the game system 1 can display on a stationary monitor an image generated by and output from the main body apparatus 2.

Figure 4:
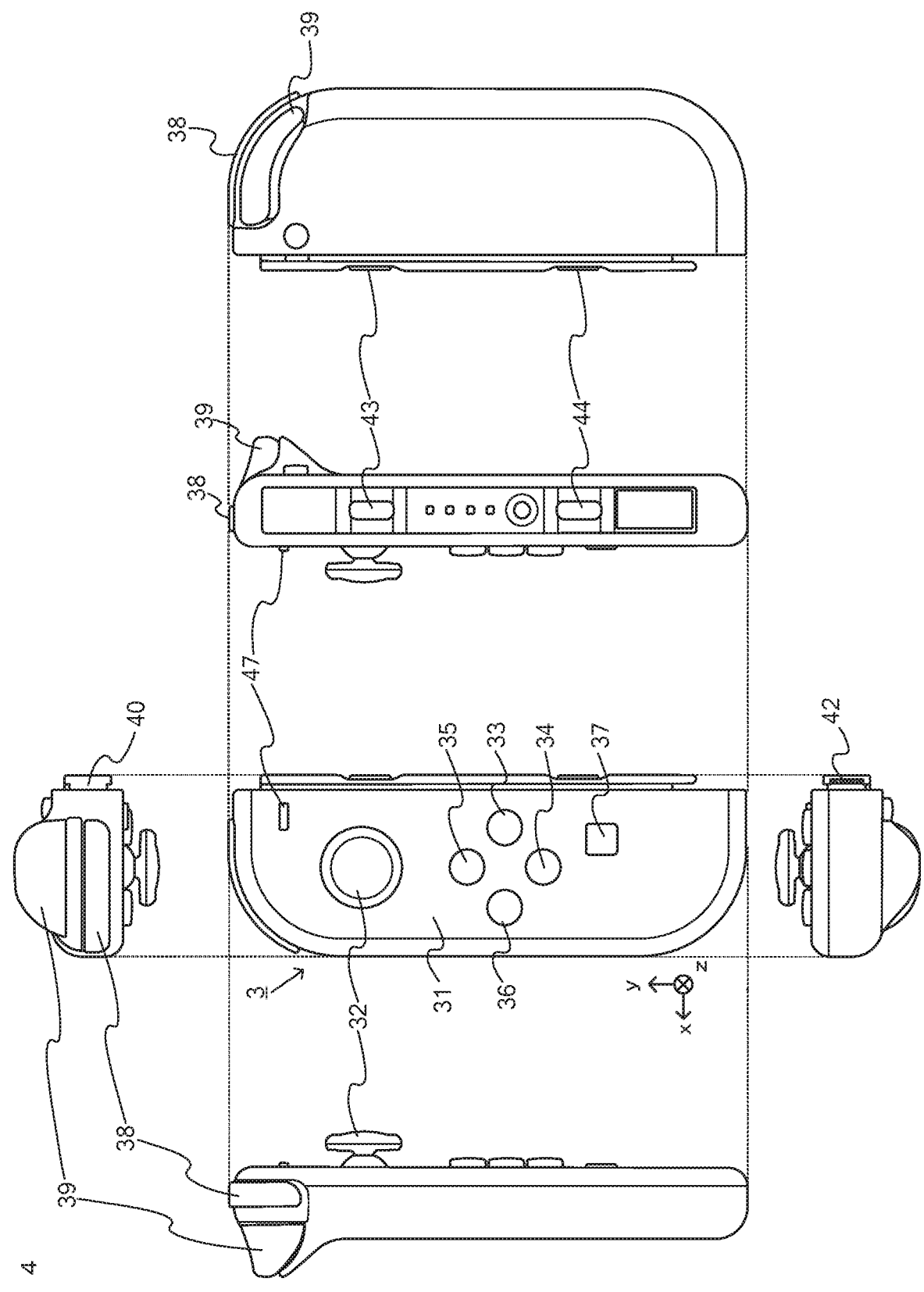
FIG. 4 is illustrative non-limiting six orthogonal views showing an example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
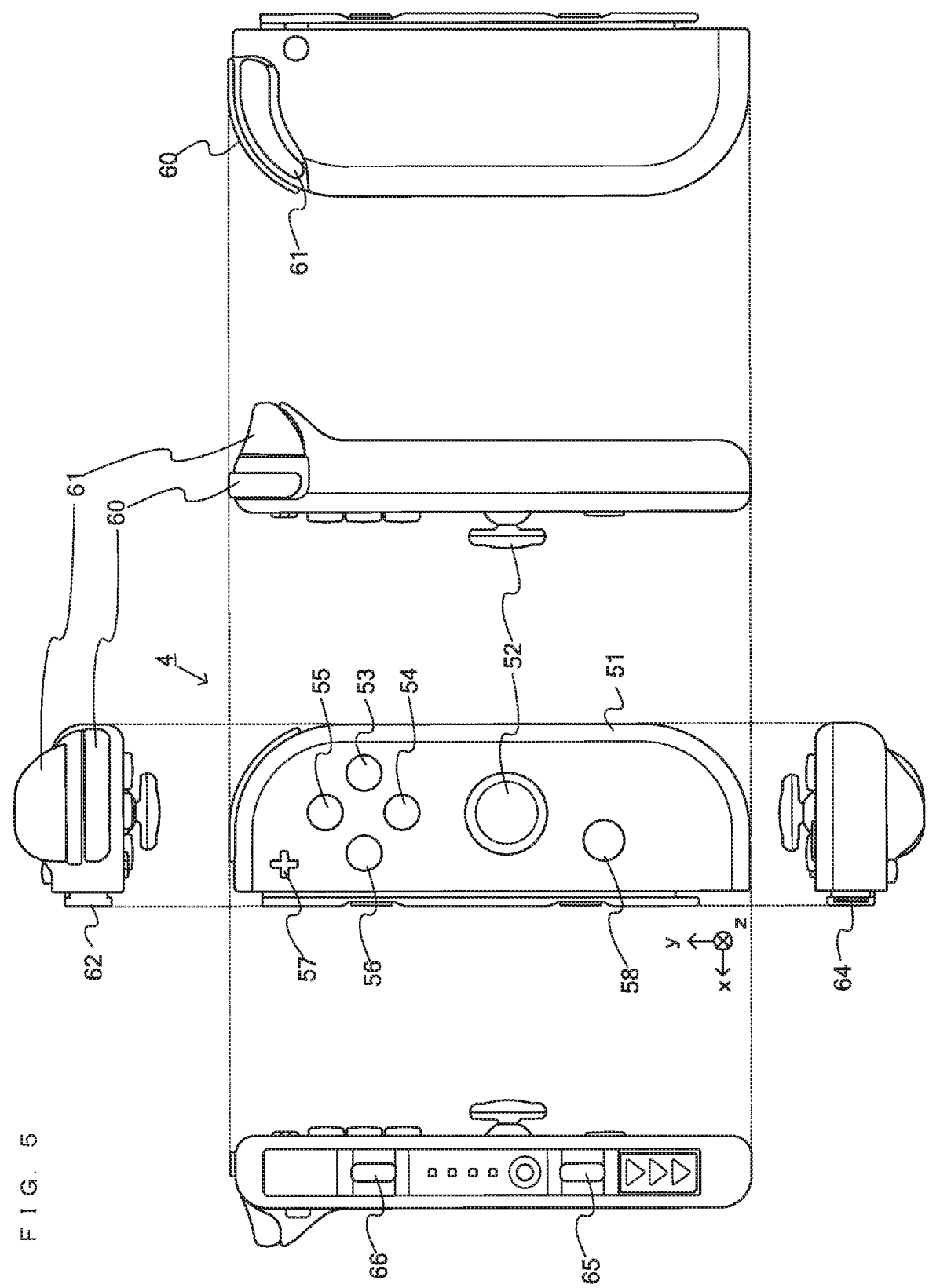
FIG. 5 is illustrative non-limiting six orthogonal views showing an example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
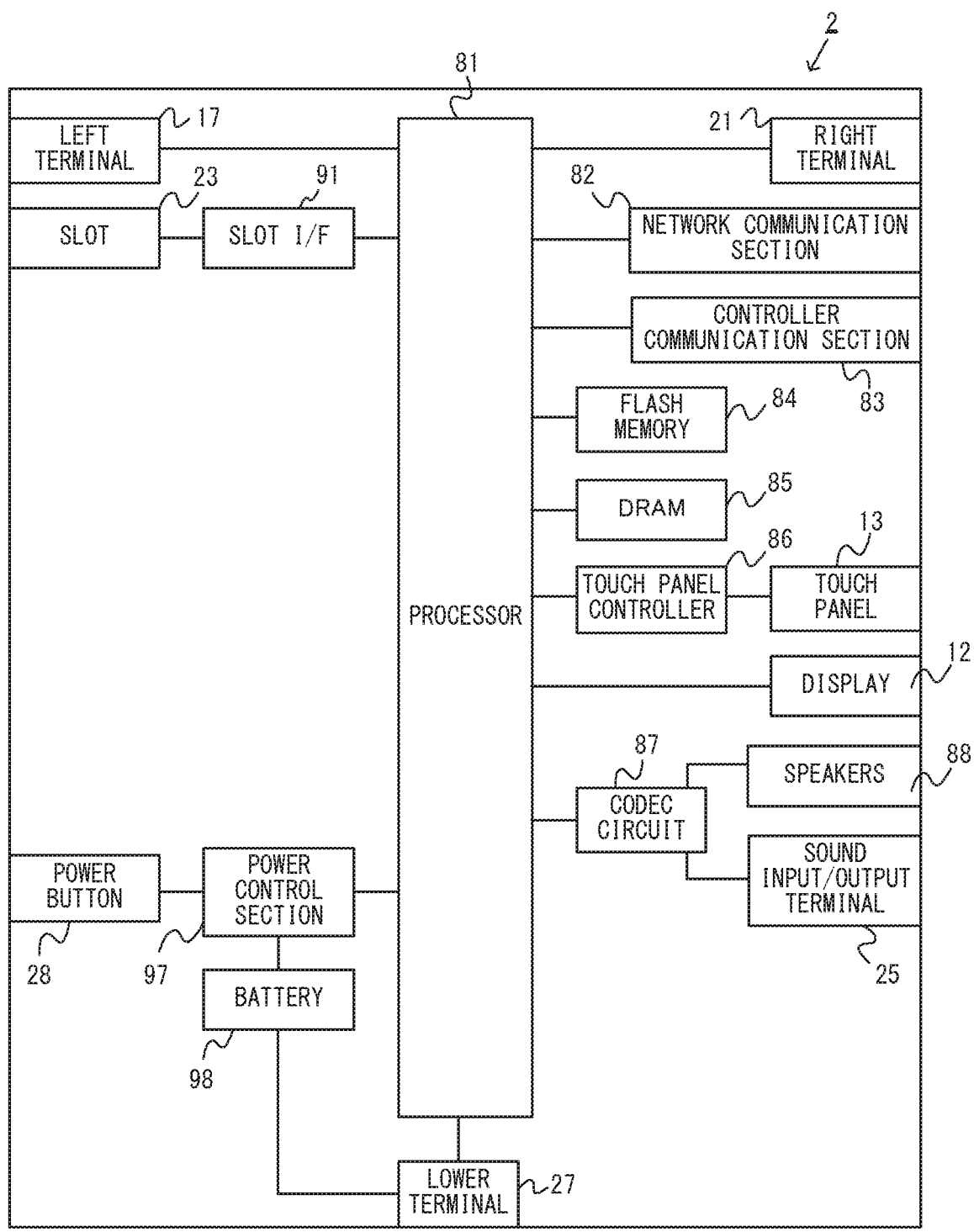
FIG. 6 is an illustrative non-limiting block diagram showing an example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
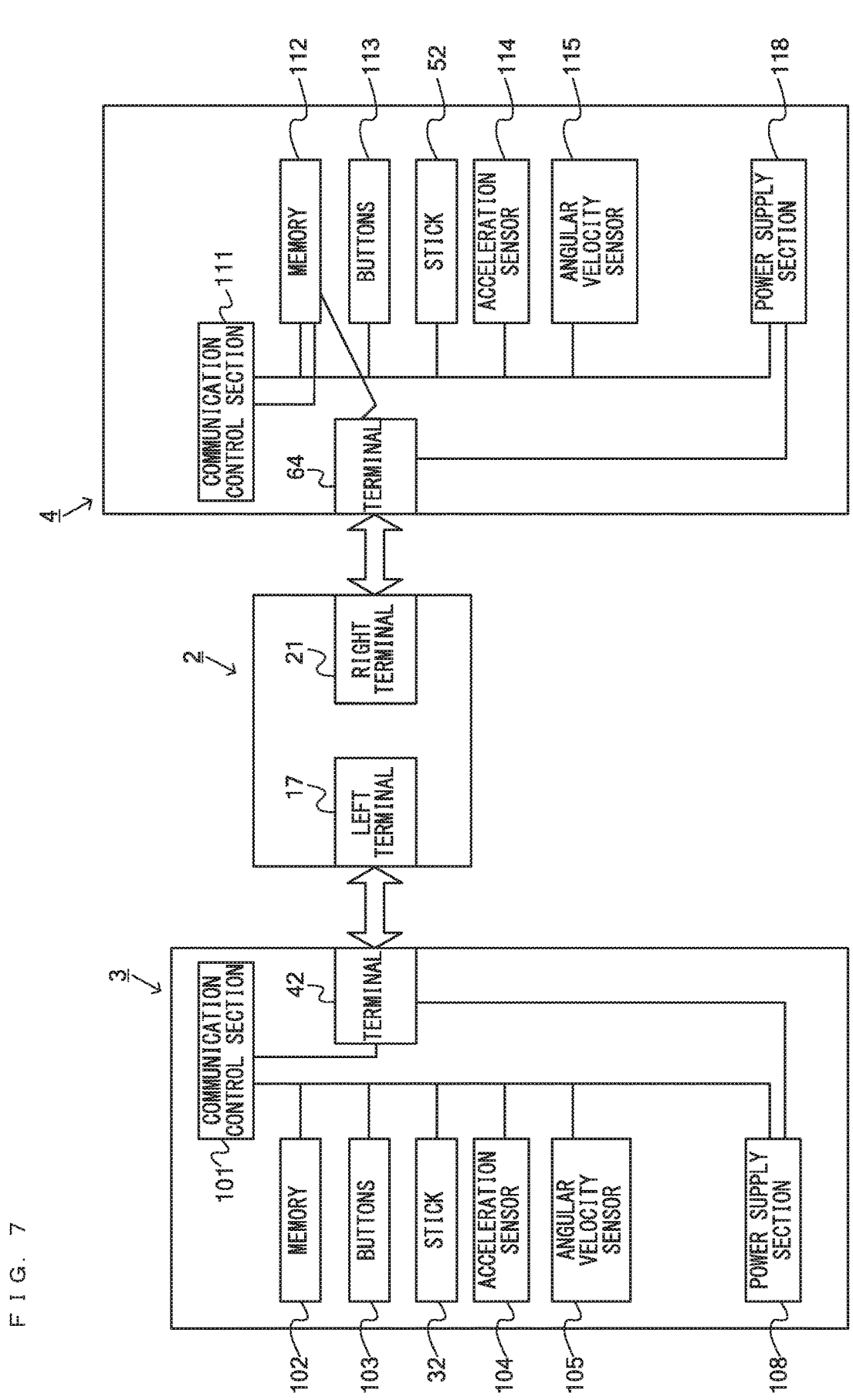
FIG. 7 is an illustrative non-limiting block diagram showing an example of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Overview of Game According to Exemplary Embodiment

Next, a description is given of an overview of a game performed by the game system 1. The game according to the exemplary embodiment includes a one-player play mode (a first mode) where a single player plays the game using controllers, and a multiplayer play mode (a second mode) where a plurality of players play the game using their controllers. First, the first mode is described, and then, the second mode is described.

(First Mode)

FIG. 8 is a diagram showing an example of a game screen when a first player performs the game in the first mode. As shown in FIG. 8, in the first mode, for example, the first player performs the game using the left controller 3 and the right controller 4. For example, the first player detaches the left controller 3 and the right controller 4 from the main body apparatus 2 and performs a game operation while holding the detached left controller 3 with their left hand and holding the detached right controller 4 with their right hand. In this case, the controllers 3 and 4 and the main body apparatus 2 are wirelessly connected together, and operation data from the controllers 3 and 4 is wirelessly transmitted to the main body apparatus 2. Further, the first player may detach the left controller 3 and the right controller 4 from the main body apparatus 2, attach the detached left controller 3 to a left side surface of a fixed apparatus (not shown), attach the detached right controller 4 to a right side surface of the fixed apparatus, and perform a game operation using the left and right controllers unified by the fixed apparatus. Alternatively, with the left controller 3 and the right controller 4 remaining attached to the main body apparatus 2, the first player may perform the game by operating the left controller 3 with their left hand and operating the right controller 4 with their right hand.

As shown in FIG. 8, in the game according to the exemplary embodiment, a first character object 71 and a second character object 72 are placed in a virtual space. Further, an enemy character 76 and a tree object 77 fixed to the ground are placed in the virtual space. Further, as shown in FIG. 8, a pointer object 73 may be displayed on the game screen. The details of the pointer object 73 will be described below. As well as these, various virtual objects are placed in the virtual space. A virtual camera is placed in the virtual space. A game image is generated based on the virtual camera, and the generated game image is displayed on the screen of the display 12 (or the stationary monitor).

The first character object 71 is a character object operated by the first player in the first mode and is controlled based on inputs to the left controller 3 and the right controller 4. Specifically, in the first mode, for example, in accordance with a direction input to the analog stick 32 of the left controller 3, the first character object 71 moves in the virtual space. For example, a right direction of the analog stick 32 is input, the first character object 71 moves in a right direction in the virtual space. The virtual camera is controlled to include the first character object 71 in its image capturing range. It should be noted that in the first mode, for example, based on a direction input to the analog stick 52 of the right controller 4, the direction of the virtual camera is controlled. Also in this case, the direction and the position of the virtual camera are controlled to include the first character object 71 in the image capturing range of the virtual camera.

Further, for example, in accordance with inputs to the buttons 53 to 56 of the right controller 4, the first character object 71 performs an action. For example, the first character object 71 jumps, acquires an object lying in the virtual space, or attacks the enemy character 76. As well as these actions, the first character object 71 may perform various actions based on operation inputs from the first player.

Figure 13:
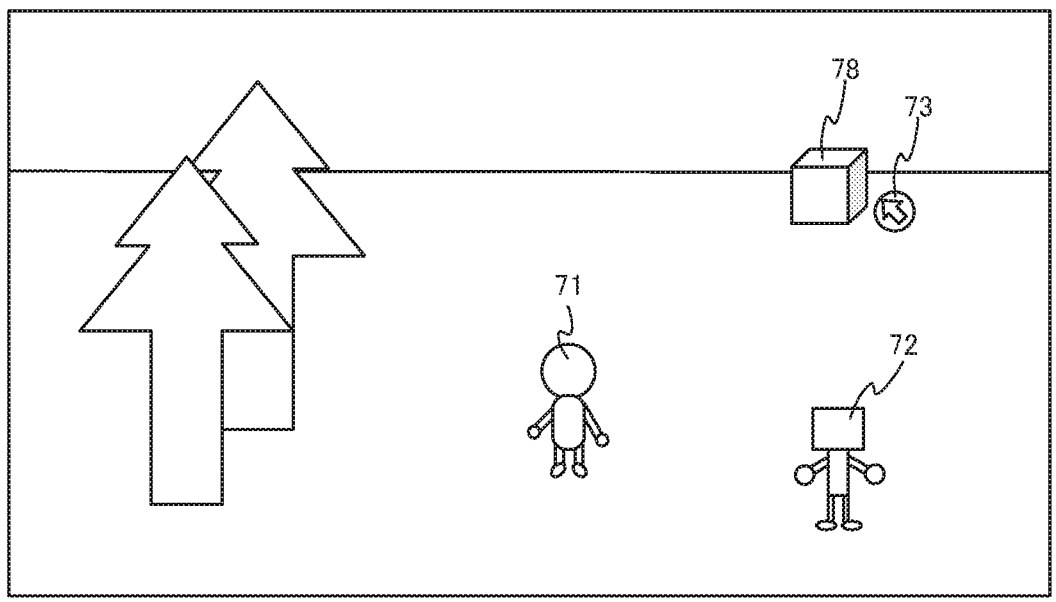
FIG. 13 is an illustrative non-limiting diagram showing the state where the pointer object 73 is located near an item object 78 placed in the virtual space.

The first character object 71 defeats the enemy character 76 in the virtual space or acquires an item object 78 placed in the virtual space (see FIG. 13). The item object 78 may be an item such as a weapon or a protective gear that can be used in the game, or may be an item that increases the physical strength (life) value of the first character object 71, or may be an item that brings the first character object 71 into a particular state (e.g., the state where the physical strength value does not decrease even if the first character object 71 is attacked by the enemy character 76), or may be currency that can be used in the game, or may be an object related to the score of the game, or may be an item required to clear the game. The first player performs the game by moving the first character object 71 in the virtual space while causing the first character object 71 to perform various actions.

The second character object 72 is a character object that supports the first character object 71 (the first player) in the first mode, and is automatically controlled by the processor 81 of the main body apparatus 2. The control of the second character object 72 in the first mode differs depending on which of a first mode A, a first mode B, and a first mode C is set.

The first mode A is a mode where the degree of support for the first character object 71 is the highest. In the first mode A, the second character object 72 automatically moves within a predetermined range including the position of the first character object 71. In the first mode A, the movement range of the second character object 72 is the widest among the three first modes. In the first mode A, without an instruction from the first player, the second character object 72 defeats the enemy character 76 in the virtual space or acquires the item object 78 lying in the virtual space. If the second character object 72 acquires the item object 78, an effect equivalent to that in a case where the first character object 71 acquires the item object 78 is produced. For example, if the second character object 72 acquires the item object 78, the item object 78 becomes a possession of the first character object 71. The same applies to a case where the second character object 72 defeats the enemy character 76. Further, in the first mode A, if the first character object 71 performs an action, the second character object 72 automatically performs the same action. For example, if the first character object 71 performs an attack action (e.g., the action of swinging a bar), simultaneously with the attack action, the second character object 72 also performs an attack action (e.g., the same action of swinging the bar or a different attack action) at the current position.

The first mode B is a mode where the degree of support for the first character object 71 is medium. In the first mode B, the second character object 72 automatically moves within a predetermined range including the position of the first character object 71, but the movement range of the second character object 72 is narrower than that in the first mode A. In the first mode B, without an instruction from the first player, the second character object 72 attacks the enemy character 76 in the virtual space or acquires the item object 78 lying in the virtual space. It should be noted that in the first mode B, the second character object 72 does not automatically perform an action similar to an action performed by the first character object 71.

The first mode C is a mode where the degree of support for the first character object 71 is the lowest. In the first mode C, the second character object 72 automatically moves within a predetermined range including the position of the first character object 71. In the first mode C, the movement range of the second character object 72 is the narrowest among the three first modes. In the first mode C, without an instruction from the first player, the second character object 72 does not attack the enemy character 76 in the virtual space or acquire the item object 78 lying in the virtual space.

In accordance with an instruction from the first player, it is determined which of the first modes A to C the second character object 72 is controlled in.

It should be noted that the game according to the exemplary embodiment may also include a mode (a third mode) where the second character object 72 that supports the first character object 71 does not appear in the virtual space. In this mode, the first player controls only the first character object 71, or moves the first character object 71 and causes the first character object 71 to acquire the item object 78, or causes the first character object 71 to attack the enemy character 76.

The enemy character 76 is automatically controlled by the processor 81 of the main body apparatus 2. Unlike the second character object 72, the enemy character 76 is a character as an enemy of the first character object 71. The enemy character 76 moves in the virtual space or attacks the first character object 71. It should be noted that a plurality of enemy characters 76 may exist in the virtual space. Further, a plurality of types of enemy characters 76 may exist. Further, a boss character and a subordinate character may exist as enemy characters 76.

No matter which of the first modes A to C the second character object 72 is automatically controlled in, in accordance with an instruction from the first player, the second character object 72 performs a predetermined action on a position in the virtual space indicated by the pointer object 73. A description is given below of the predetermined action performed by the second character object 72 on the position in the virtual space indicated by the pointer object 73.

Figure 9:
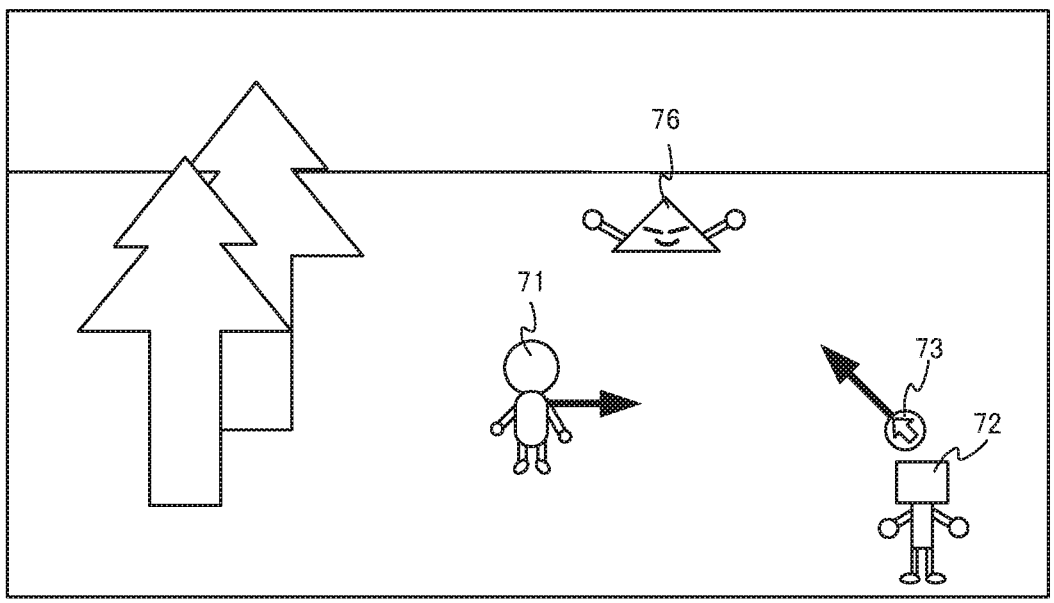
FIG. 9 is an illustrative non-limiting diagram showing the state where a pointer object 73 and a first character object 71 move on a game screen shown in FIG. 8.

FIG. 9 is a diagram showing the state where the pointer object 73 and the first character object 71 move on the game screen shown in FIG. 8.

As shown in FIG. 9, the pointer object 73 is displayed on the game screen. The pointer object 73 is not normally displayed in the first mode, but is displayed on the game screen if an instruction from the first player is given (e.g., the first R-button 60 is pressed). The pointer object 73 represents an indicated position on the game screen. The first player moves the pointer object 73 using the right controller 4. Specifically, based on inertial data from the inertial sensors (the acceleration sensor 114 and the angular velocity sensor or 115) of the right controller 4, the position of the pointer object 73 is controlled. The inertial data is data output from the right controller 4, and may be data representing the orientation of the right controller 4 calculated based on the outputs of the inertial sensors (the acceleration sensor 114 and the angular velocity sensor 115) or may be data representing an acceleration value, an angular velocity value, and the like output from the inertial sensors.

In accordance with a change in the orientation of the right controller 4, the pointer object 73 moves in the game screen. For example, when the first player directs an upper surface of the right controller 4 (a surface on which the first R-button 60 is provided) to the game screen, and if the orientation of the right controller 4 is changed so that the upper surface is directed to the upper left, as shown in FIG. 9, the pointer object 73 moves in an upper left direction on the game screen.

If, on the other hand, the first player inputs the right direction using the analog stick 32 of the left controller 3, as shown in FIG. 9, the first character object 71 moves in the right direction. Further, for example, if the first player presses the button 53 of the right controller 4, the first character object 71 jumps in the virtual space.

Figure 10:
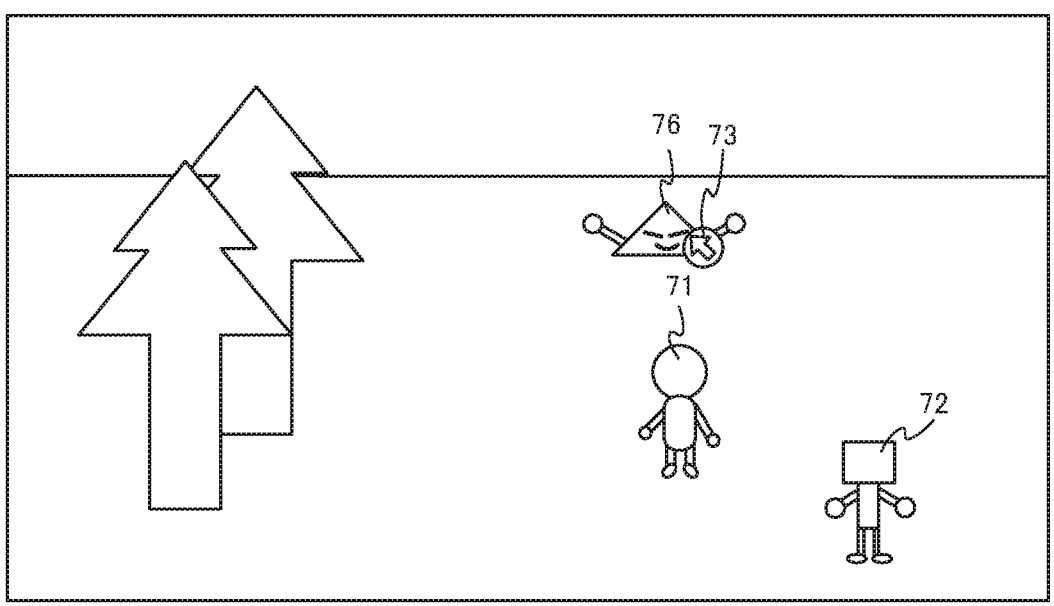
FIG. 10 is an illustrative non-limiting diagram showing an example of the game screen after the pointer object 73 and the first character object 71 move from the state in FIG. 9.

FIG. 10 is a diagram showing an example of the game screen after the pointer object 73 and the first character object 71 move from the state in FIG. 9. As shown in FIG. 10, the pointer object 73 is present at the position of an enemy character 76. Further, the first character object 71 moves further to the right side than in FIG. 9. Further, the second character object 72 is located slightly further on the left side than in FIG. 9. The movement of the second character object 72 at this time is automatically made by the processor 81. It should be noted that the position of the second character object 72 depends on the position of the first character object 71. That is, the position of the second character object 72 is not determined completely independently of the first character object 71, and is determined in a predetermined range including the position of the first character object 71. The second character object 72 moves automatically (without an instruction from the first player) within the predetermined range.

If a predetermined instruction is given (e.g., the first R-button 60 is pressed) by the first player in the state shown in FIG. 10, the second character object 72 moves to a position in the virtual space indicated by the pointer object 73 and performs a predetermined action on the position.

Figure 11:
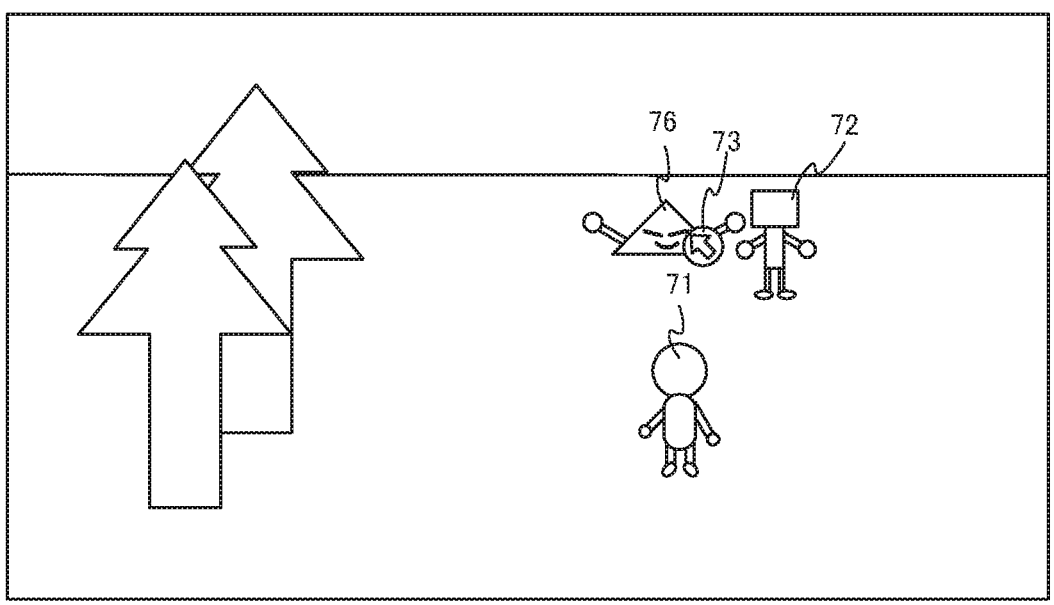
FIG. 11 is an illustrative non-limiting diagram showing an example of the game screen after a second character object 72 moves to a position in a virtual space indicated by the pointer object 73.
Figure 12:
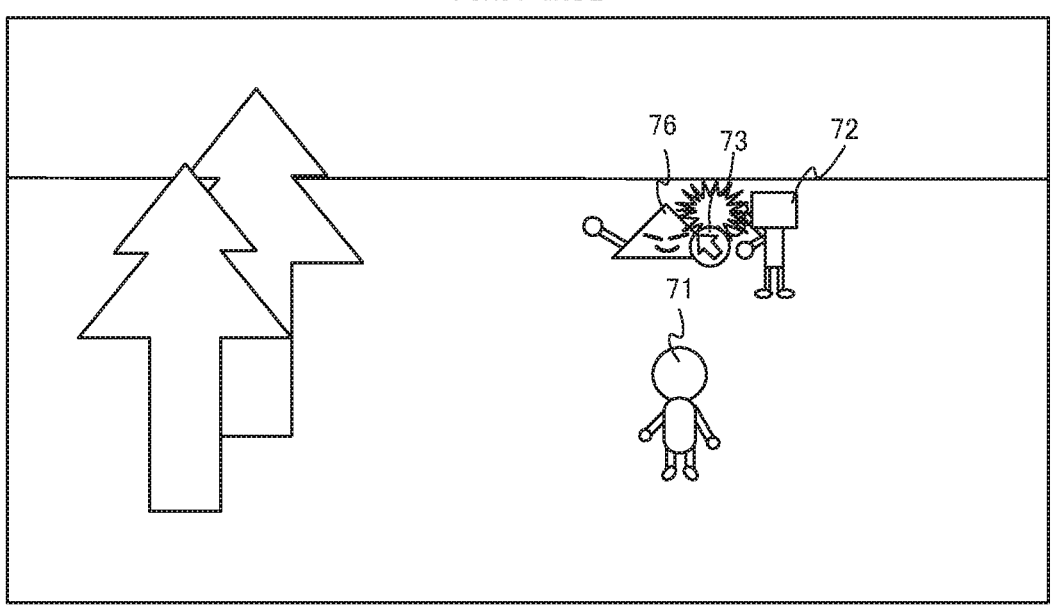
FIG. 12 is an illustrative non-limiting diagram showing an example of the state where the second character object 72 performs a predetermined action on the position in the virtual space indicated by the pointer object 73.

FIG. 11 is a diagram showing an example of the game screen after the second character object 72 moves to the position in the virtual space indicated by the pointer object 73. FIG. 12 is a diagram showing an example of the state where the second character object 72 performs the predetermined action on the position in the virtual space indicated by the pointer object 73.

As shown in FIG. 11, if a predetermined instruction is given by the first player, the second character object 72 moves to the position in the virtual space indicated by the pointer object 73. Then, if an enemy character 76 is present at the position in the virtual space indicated by the pointer object 73, as shown in FIG. 12, the second character object 72 attacks the enemy character 76. If the enemy character 76 is attacked, or if the physical strength value of the enemy character 76 becomes 0 due to this attack, the enemy character 76 falls over.

As described above, in accordance with a predetermined instruction from the first player, the second character object 72 performs an attack action (an example of the predetermined action) on the position indicated by the pointer object 73. Consequently, the first character object 71 is supported.

It should be noted that in the examples shown in FIGS. 11 and 12, the second character object 72 moves to the position in the virtual space indicated by the pointer object 73 and performs the attack action on the position. The second character object 72 may perform the attack action on the position without moving to the position in the virtual space indicated by the pointer object 73. For example, when the second character object 72 is present at the position shown in FIG. 10, and if a predetermined instruction is given by the first player, the second character object 72 may fire an arrow object at this position toward the position in the virtual space indicated by the pointer object 73. The fired arrow object moves in the virtual space and reaches the position in the virtual space indicated by the pointer object 73. Then, the arrow object hits the enemy character 76, thereby attacking the enemy character 76.

Figure 14:
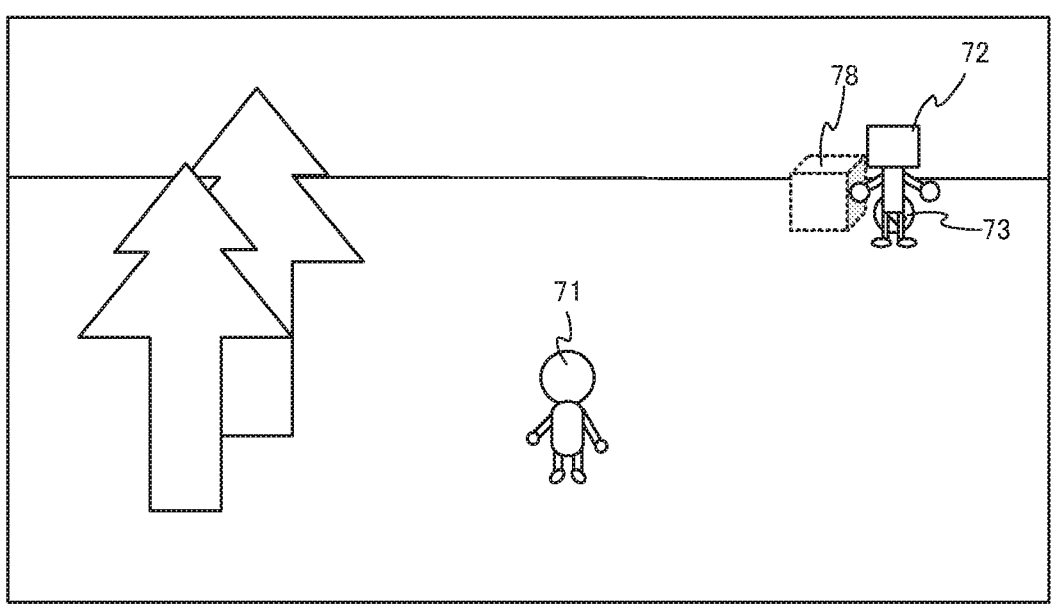
FIG. 14 is an illustrative non-limiting diagram showing the state where the second character object 72 acquires the item object 78 in accordance with an instruction from the first player.

Next, a description is given of another example of the predetermined action performed by the second character object 72. FIG. 13 is a diagram showing the state where the pointer object 73 is located near an item object 78 placed in the virtual space. FIG. 14 is a diagram showing the state where the second character object 72 acquires the item object 78 in accordance with an instruction from the first player.

As shown in FIG. 13, an item object 78 is placed in the virtual space. The item object 78 may be placed on the ground in the virtual space, or may be hidden inside another object placed in the virtual space, such as rock. The item object 78 is an object that can be acquired by the first character object 71 moving to its position. If the first character object 71 acquires the item object 78, the first character object 71 may enter a particular state and be able to advance the game advantageously. Further, if the first character object 71 acquires the item object 78, the score of the game may be added.

The first player changes the orientation of the right controller 4, thereby moving the pointer object 73 near to the item object 78 (within a predetermined range from the position of the item object 78). Then, if a predetermined instruction is given (e.g., the first R-button 60 is pressed) by the first player in the state shown in FIG. 13, as shown in FIG. 14, the second character object 72 moves to a position in the virtual space indicated by the pointer object 73 and acquires the item object 78. The item object 78 acquired by the second character object 72 is regarded as being acquired by the first character object 71. If the item object 78 is acquired, the item object 78 is erased from the game screen.

As described above, in the first mode, based on an operation input assigned to the first player (a direction input to the analog stick 32 of the left controller 3, inputs to the buttons 53 to 56 of the right controller 4, or an input for changing the orientation of the right controller 4), the first character object 71 is controlled (move, jump, attack, acquire an item, or the like) in the virtual space, and the pointer object 73 is also controlled on the game screen. Further, in the first mode, the second character object 72 is automatically controlled in the virtual space and performs a predetermined action on a position in the virtual space indicated by the pointer object 73.

As described above, the first player can not only operate the first character object 71, but also cause the second character object 72 that basically automatically performs an action, to perform a predetermined action. Consequently, even a single player can easily control a plurality of character objects and advance the game advantageously.

It may be possible to cause the second character object 72 to perform a predetermined action other than the attack on the enemy character 76 and the acquisition of the item object 78 that are described above. For example, when the tree object 77 is indicated using the pointer object 73, and if a predetermined instruction is given by the first player, the second character object 72 may move to the position of the tree object 77 and shake the tree object 77. As described above, if an object is present at a position in the virtual space indicated by the pointer object 73, the second character object 72 performs various actions corresponding to the type of the object on the object.

If, on the other hand, an object is not present at a position in the virtual space indicated by the pointer object 73, the second character object 72 moves to the position. Consequently, the first player can move the second character object 72 to a desired position.

It should be noted that in the exemplary embodiment, in the first mode, also based on a touch operation on the touch panel 13, a position is indicated using the pointer object 73, and an instruction to perform a predetermined action is given.

Figure 15:
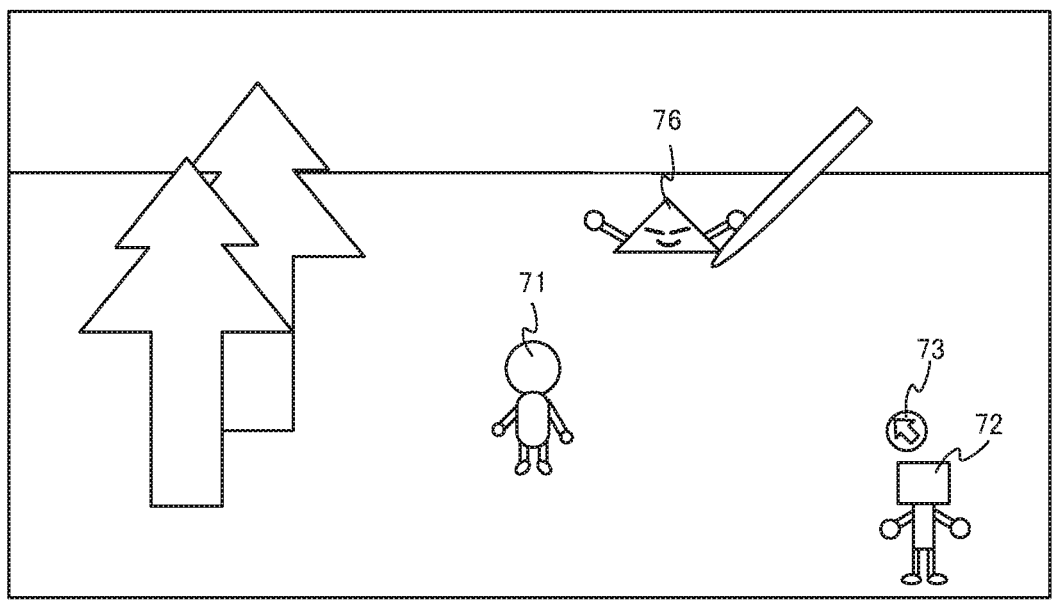
FIG. 15 is an illustrative non-limiting diagram showing an example of the game screen immediately before a touch operation on a touch panel 13 is performed.
Figure 16:
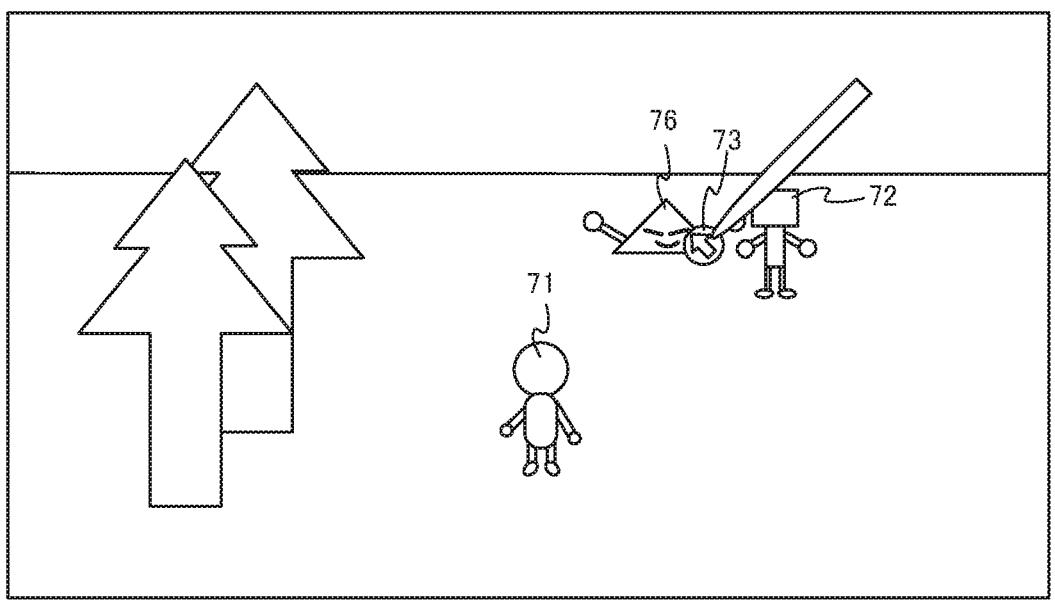
FIG. 16 is an illustrative non-limiting diagram showing an example of the game screen immediately after the touch operation on the touch panel 13 is performed.

FIG. 15 is a diagram showing an example of the game screen immediately before a touch operation on the touch panel 13 is performed. FIG. 16 is a diagram showing an example of the game screen immediately after the touch operation on the touch panel 13 is performed.

As shown in FIG. 15, when the first player controls the first character object 71 using the left controller 3 and the right controller 4, the position of an enemy character 76 (or a portion near it) is touched using a touch pen or a finger. As a result, as shown in FIG. 16, the pointer object 73 moves to the touch position, and the second character object 72 moves to the touch position. Then, the second character object 72 performs an attack action on the enemy character 76 present at the touch position.

That is, if a touch operation on the touch panel 13 is performed, processing is performed on the assumption that the indication of a position using the pointer object 73 by changing the orientation of the right controller 4, and the giving of a predetermined instruction (the pressing of the first R-button 60) to cause the second character object 72 to perform a predetermined action that are described above are simultaneously performed.

It should be noted that similarly to the above description, if an enemy character 76 is not present at the touch position, the second character object 72 performs a different action. For example, if an item object 78 is present at the touch position, the second character object 72 moves to the touch position and acquires the item object 78. Further, if an object is not present at the touch position, the second character object 72 moves to the touch position.

As described above, based on a touch operation on the touch panel 13, a position is indicated using the pointer object 73, and an instruction to perform a predetermined action is given. That is, based on a touch operation on the touch panel 13, the pointer object 73 moves to the touch position, and the second character object 72 performs a predetermined action on a position in the virtual space indicated by the pointer object 73. It should be noted that based on a touch operation on the touch panel 13, a position may be only indicated using the pointer object 73. In this case, an instruction to perform a predetermined action may be given based on another operation (e.g., a button operation on the right controller 4, a touch operation on the touch panel 13 for the second time, or the like).

(Second Mode)

Next, a description is given of the second mode where different players control the first character object 71 and the second character object 72. For example, when the first player performs the game in the first mode, and if the first player gives an instruction to switch modes, the game is suspended, and a switch is made to the second mode. For example, when the first player performs the game in the first mode, and if a predetermined button is pressed, the game is suspended. If the game is suspended, the flow of time in the game temporarily stops, and objects moving in the virtual space, such as the first character object 71, the second character object 72, and an enemy character 76, temporarily stop. Then, if an instruction to switch modes is further given, the first mode is switched to the second mode. If the first mode is switched to the second mode, the game is resumed in the second mode from the state immediately before the game in the first mode is suspended.

FIG. 17 is a diagram showing an example of the game screen after the first mode is switched to the second mode in the state shown in FIG. 8. As shown in FIG. 17, in the second mode, for example, the first player performs the game using the left controller 3, and a second player performs the game using the right controller 4.

In the second mode, the first character object 71 is controlled based on an operation input to the left controller 3. Specifically, based on a direction input to the analog stick 32 of the left controller 3, the first character object 71 moves in the virtual space. Further, for example, based on an input to the button 34 of the left controller 3, the first character object 71 jumps in the virtual space.

Further, in the second mode, the second character object 72 is controlled based on an operation input to the right controller 4. Specifically, based on a direction input to the analog stick 52 of the right controller 4, the second character object 72 moves in the virtual space. Further, for example, based on an input to the button 54 of the right controller 4, the second character object 72 performs an attack action in the virtual space.

It should be noted that in accordance with an operation of the first player (the left controller 3), the first character object 71 can move in the virtual space, and in accordance with the movement of the first character object 71, the virtual camera also moves in the virtual space. The position and the orientation of the virtual camera are controlled to include the first character object 71 in the image capturing range of the virtual camera.

On the other hand, basically, in accordance with an operation of the second player (the right controller 4), the second character object 72 can move in the virtual space, but may be restricted from moving so as not to come out of the image capturing range of the virtual camera. For example, in a case where the second character object 72 is located at the right end of the game screen, and even if the second player inputs a right direction, the second character object 72 may be controlled not to move further in the right direction. That is, basically, the second character object 72 can move in the virtual space in accordance with an operation of the second player, but its movement range may depend on the position of the first character object 71.

It should be noted that in the second mode, the movement of the second character object 72 may be completely independently controlled without depending on the position of the first character object 71.

Further, in the example shown in FIG. 17, the first character object 71 is controlled using the left controller 3, and the second character object 72 is controlled using the right controller 4. The control of the first character object 71 and the second character object 72 is not limited to this. The first character object 71 may be controlled using the right controller 4, and the second character object 72 may be controlled using the left controller 3.

Further, a plurality of sets of the left controller 3 and the right controller 4 may be prepared, and character objects may be controlled using the controllers of the plurality of sets. For example, the first character object 71 may be controlled using the left controller 3 and the right controller 4 of a first set, and the second character object 72 may be controlled using the left controller 3 and the right controller 4 of a second set.

Further, a controller different from the above left controller 3 and right controller 4, having a function equivalent to those of these, and obtained by integrating these (hereinafter referred to as an "integrated controller") may be connected to the main body apparatus 2. In a left side portion of such an integrated controller, a left analog stick having a function equivalent to that of the analog stick 32 of the left controller 3 and a plurality of buttons are provided. Further, in a right side portion of the integrated controller, a right analog stick having a function equivalent to that of the analog stick 52 of the right controller 4 and a plurality of buttons are provided. Further, in the integrated controller, inertial sensors (an acceleration sensor and an angular velocity sensor) are provided. If the integrated controller is connected to the main body apparatus 2, the first character object 71 may be controlled using the integrated controller. In this case, another integrated controller, the left controller 3, or the right controller 4 may also be connected to the main body apparatus 2, and the second character object 72 may be controlled using the connected other integrated controller, left controller 3, or right controller 4.

As described above, in the second mode, based on an operation input assigned to the first player (an input to the left controller 3), the first character object 71 is controlled (the action of moving, attacking, acquiring an item, or the like) in the virtual space. Further, based on an operation input assigned to the second player (an input to the right controller 4), the second character object 72 is controlled (the action of moving, attacking, acquiring an item, or the like) in the virtual space.

Consequently, it is possible to cause the second player to participate in the game that has been performed by the first player, and cause the second player to support the first player.

(Details of Game Processing)

Next, an example of game processing performed by the main body apparatus 2 is specifically described. First, a description is given of data stored in the main body apparatus 2.

Figure 18:
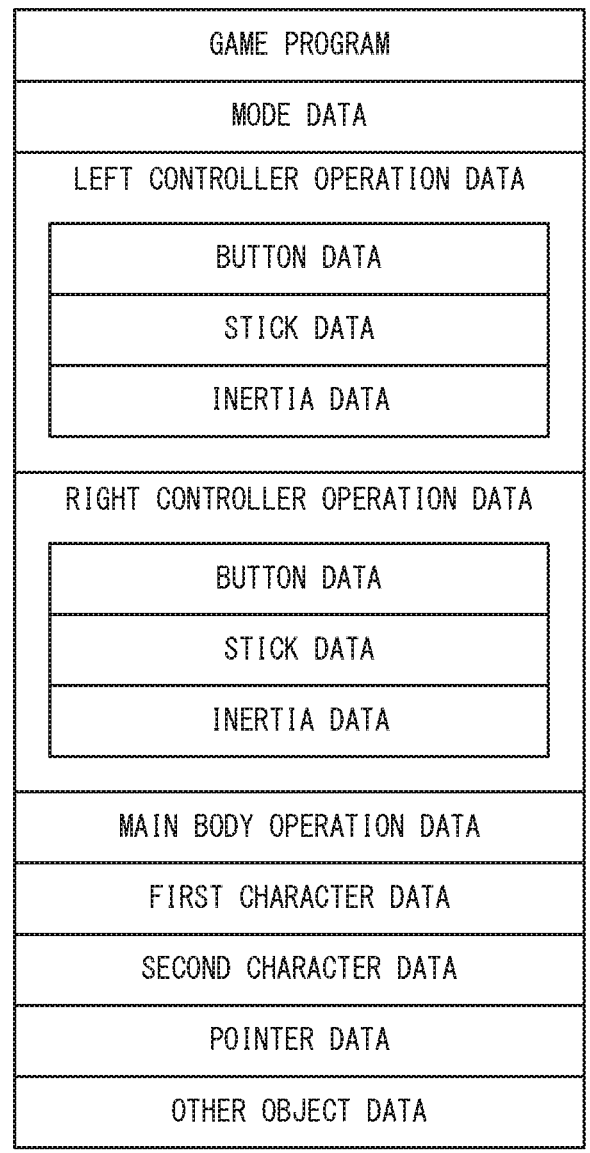
FIG. 18 is an illustrative non-limiting diagram showing an example of data stored in a memory of the main body apparatus 2.

FIG. 18 is a diagram showing an example of data stored in a memory of the main body apparatus 2. The data shown in FIG. 18 is stored in any of the DRAM 85, the flash memory 84, and an external storage medium. It should be noted that a description is given below of a case where the first player performs the game in the first mode.

As shown in FIG. 18, the memory of the main body apparatus 2 stores a game program, mode data, left controller operation data, right controller operation data, main body operation data, first character data, second character data, pointer data, and other object data. As well as these, various pieces of data necessary for the game are stored.

The game program is a program for executing the game processing according to the exemplary embodiment. The game program is stored in, for example, an external storage medium attached to the slot 23, and if the game is started, is loaded from the external storage medium into the DRAM 85.

The mode data is data indicating whether the current mode is the first mode or the second mode. In the exemplary embodiment, if an instruction is not given by a player, the first mode between the first mode and the second mode is set. If an instruction is given by the player, the first mode is switched to the second mode.

The left controller operation data is operation data transmitted from the left controller 3. The left controller operation data includes button data regarding the pressing states of the various buttons (33 to 36, 38, 39, 43, 44, and the like) of the left controller 3, and stick data corresponding to a direction input to the analog stick 32 of the left controller 3. Further, the left controller operation data includes inertial data corresponding to outputs from the inertial sensors (the acceleration sensor 104 and the angular velocity sensor 105). The inertial data may be data representing the orientation of the left controller 3 calculated based on an acceleration value and an angular velocity value detected by the acceleration sensor 104 and the angular velocity sensor 105. Further, the inertial data may be data representing the acceleration value and the angular velocity value detected by the acceleration sensor 104 and the angular velocity sensor 105.

The right controller operation data is operation data transmitted from the right controller 4. The right controller operation data includes button data regarding the pressing states of the various buttons (53 to 56, 60, 61, 65, 66, and the like) of the right controller 4, and stick data corresponding to a direction input to the analog stick 52 of the right controller 4. Further, the right controller operation data includes inertial data corresponding to outputs from the inertial sensors (the acceleration sensor 114 and the angular velocity sensor 115). The inertial data may be data representing the orientation of the right controller 4 calculated based on an acceleration value and an angular velocity value detected by the acceleration sensor 114 and the angular velocity sensor 115. Further, the inertial data may be data representing the acceleration value and the angular velocity value detected by the acceleration sensor 114 and the angular velocity sensor 115.

The main body operation data is data corresponding to an operation on the main body apparatus 2 and includes touch data corresponding to a touch operation on the touch panel 13. The touch data is coordinate data indicating a touch position on the touch panel 13 and includes a coordinate value in the horizontal direction of the screen and a coordinate value in the vertical direction.

The first character data is data regarding the first character object 71. The first character data includes data regarding the position, the orientation, and the like of the first character object 71 in the virtual space. Further, the first character data includes data regarding the physical strength value of the first character object 71, data regarding the shape, and data regarding an item object 78 acquired by the first character object 71.

The second character data is data regarding the second character object 72. The second character data includes data regarding the position, the orientation, and the like of the second character object 72 in the virtual space. Further, the second character data includes data regarding the shape of the second character object 72.

The pointer data is data regarding the pointer object 73. The pointer data includes position information regarding the pointer object 73. The position information regarding the pointer object 73 may be information representing a position on the game screen (two-dimensional coordinate values on the screen). Further, the position information regarding the pointer object 73 may be information representing a position in the virtual space (three-dimensional coordinate values in the virtual space). Further, the pointer data includes image data of the pointer object 73. Further, the pointer data includes data indicating whether or not to display the pointer object 73 on the game screen.

The other object data is data regarding other virtual objects, such as the enemy character 76 and the tree object 77, placed in the virtual space. For example, the other object data includes, as the data regarding the enemy character 76, data regarding the position and the orientation of the enemy character 76 in the virtual space, data regarding the shape of the enemy character 76, the physical strength value of the enemy character 76, and the like.

(Description of Flow Charts)

Figure 19:
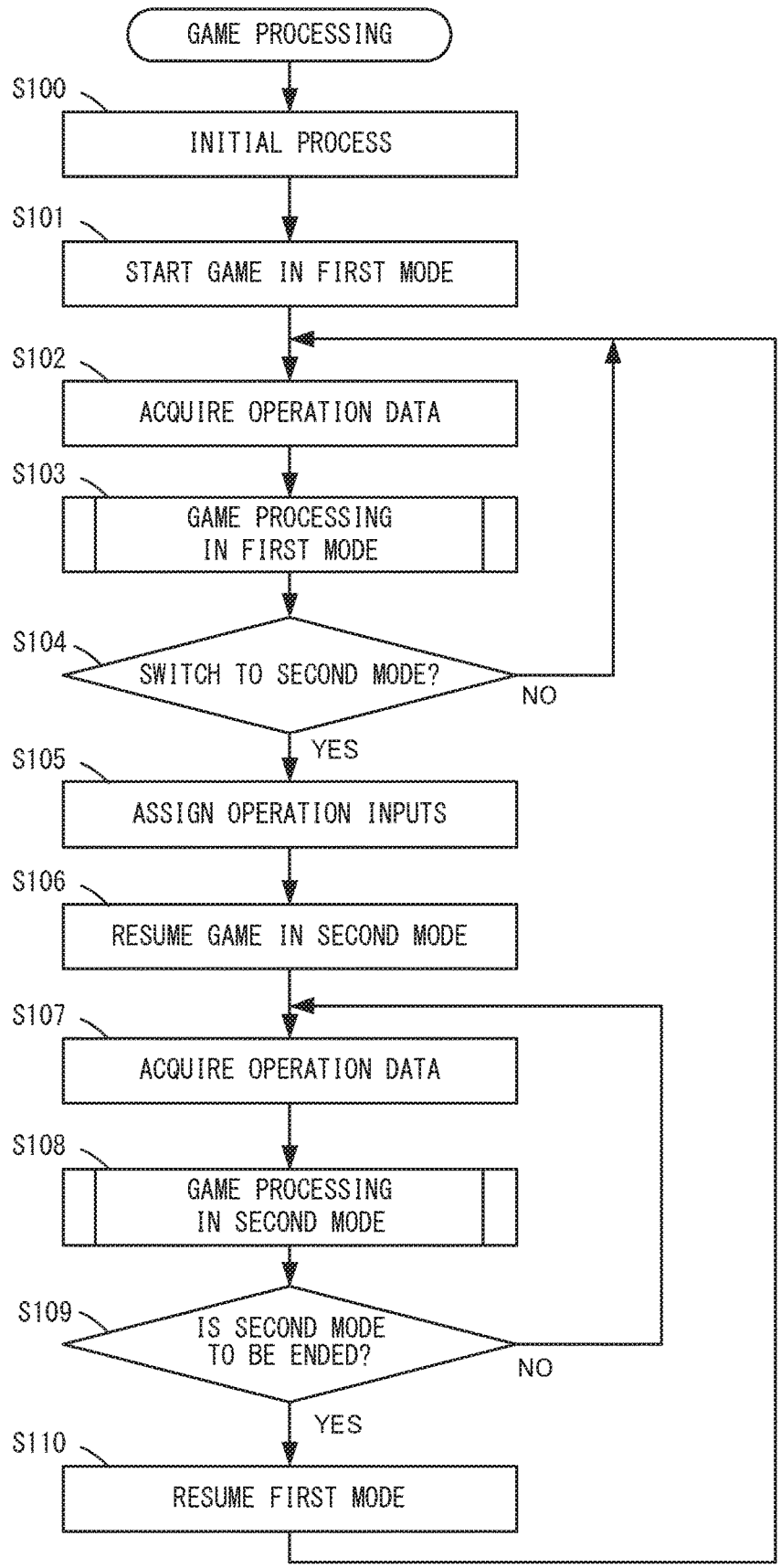
FIG. 19 is an illustrative non-limiting flow chart showing an example of game processing performed by a processor 81 of the main body apparatus 2.

Next, a description is given of the details of the game processing performed by the main body apparatus 2. FIG. 19 is a flow chart showing an example of game processing performed by the processor 81 of the main body apparatus 2. In FIG. 19, an example is described where the game according to the exemplary embodiment is executed in the first mode or the second mode.

As shown in FIG. 19, if an instruction to start the game is given, first, the processor 81 performs an initial process (step S100). Specifically, the processor 81 places the first character object 71 and the second character object 72 in the virtual space and places the enemy character 76 and other virtual objects in the virtual space. After the initial process, the processor 81 starts the game in the first mode (step S101).

Next, the processor 81 acquires operation data (step S102). The left controller 3 and the right controller 4 repeatedly transmit left controller operation data and right controller operation data to the main body apparatus 2 at predetermined time intervals (e.g., $\frac{1}{200}$-second intervals). The memory of the main body apparatus 2 temporarily stores the left controller operation data and the right controller operation data received from the left controller 3 and the right controller 4. In step S102, the processor 81 acquires the left controller operation data and the right controller operation data stored in the memory. Further, based on an output from the touch panel 13 of the main body apparatus 2, the processor 81 acquires touch data indicating a touch position.

Next, based on the acquired operation data, the processor 81 performs game processing in the first mode (step S103). Here, based on operation inputs assigned to the first player (specifically, operation inputs to the left controller 3 and the right controller 4), the processor 81 controls the first character object 71 and controls the pointer object 73. Further, the processor 81 automatically controls the second character object 72 and causes the second character object 72 to perform a predetermined action on a position in the virtual space indicated by the pointer object 73. The details of the process of step S103 will be described below.

Subsequently to step S103, the processor 81 determines whether or not to switch to the second mode (step S104). Specifically, based on the operation data acquired in step S102, the processor 81 determines whether or not an instruction to switch to the second mode is given. If the determination is YES in step S104, next, the processor 81 performs the process of step S105.

If, on the other hand, the determination is NO in step S104, the processor 81 performs the process of step S102 again. The processes of steps S102 to S104 are repeatedly performed at predetermined frame time (e.g., $\frac{1}{60}$-second) intervals, whereby the first player performs the game in the first mode.

Next, in step S105, the processor 81 assigns operation inputs (controllers) to the character objects. In the exemplary embodiment, a controller in which an operation on a predetermined button is performed first is assigned to the first character object 71. For example, if the first player presses a predetermined operation button of the left controller 3 first, and the second player presses a predetermined operation button of the right controller 4 next, the first player (the left controller 3) is assigned to the first character object 71, and the second player (the right controller 4) is assigned to the second character object 72. In the following description, in step S105, the first player (the left controller 3) is assigned to the first character object 71, and the second player (the right controller 4) is assigned to the second character object 72.

After the process of step S105 is performed, the processor 81 resumes the game in the second mode (step S106). Here, the game is resumed from the state immediately before the switch is made to the second mode in step S104. That is, the scene of the game, the state of the virtual space, the states (the positions in the virtual space, the physical strength values, and the like) of the first character object 71 and the second character object 72, the state of the enemy character 76, the state of the other objects in the virtual space, and the like are maintained before and after the switch to the second mode.

Subsequently to step S106, the processor 81 acquires operation data (step S107). The process of step S107 is similar to that of step S102.

Next, based on the acquired operation data, the processor 81 performs game processing in the second mode (step S108). Here, based on an operation input assigned to the first player (specifically, an operation input to the left controller 3), the processor 81 controls the first character object 71. Further, based on an operation input assigned to the second player (specifically, an operation input to the right controller 4), the processor 81 controls the second character object 72. The details of the process of step S108 will be described below.

Subsequently to step S108, the processor 81 determines whether or not to end the second mode (step S109). Specifically, based on the operation data acquired in step S107, the processor 81 determines whether or not an instruction to end the second mode is given. If the determination is YES in step S109, next, the processor 81 performs the process of step S110.

If, on the other hand, the determination is NO in step S109, the processor 81 performs the process of step S107 again. The processes of steps S107 to S109 are repeatedly performed in at predetermined frame time (e.g., 1/60-second) intervals, whereby the first player and the second player perform the game in the second mode.

In step S110, the processor 81 resumes the game in the first mode and returns the processing to step S102. Here, the game is resumed from the state immediately before the second mode is ended in step S109.

(Game Processing in First Mode)

Figure 20:
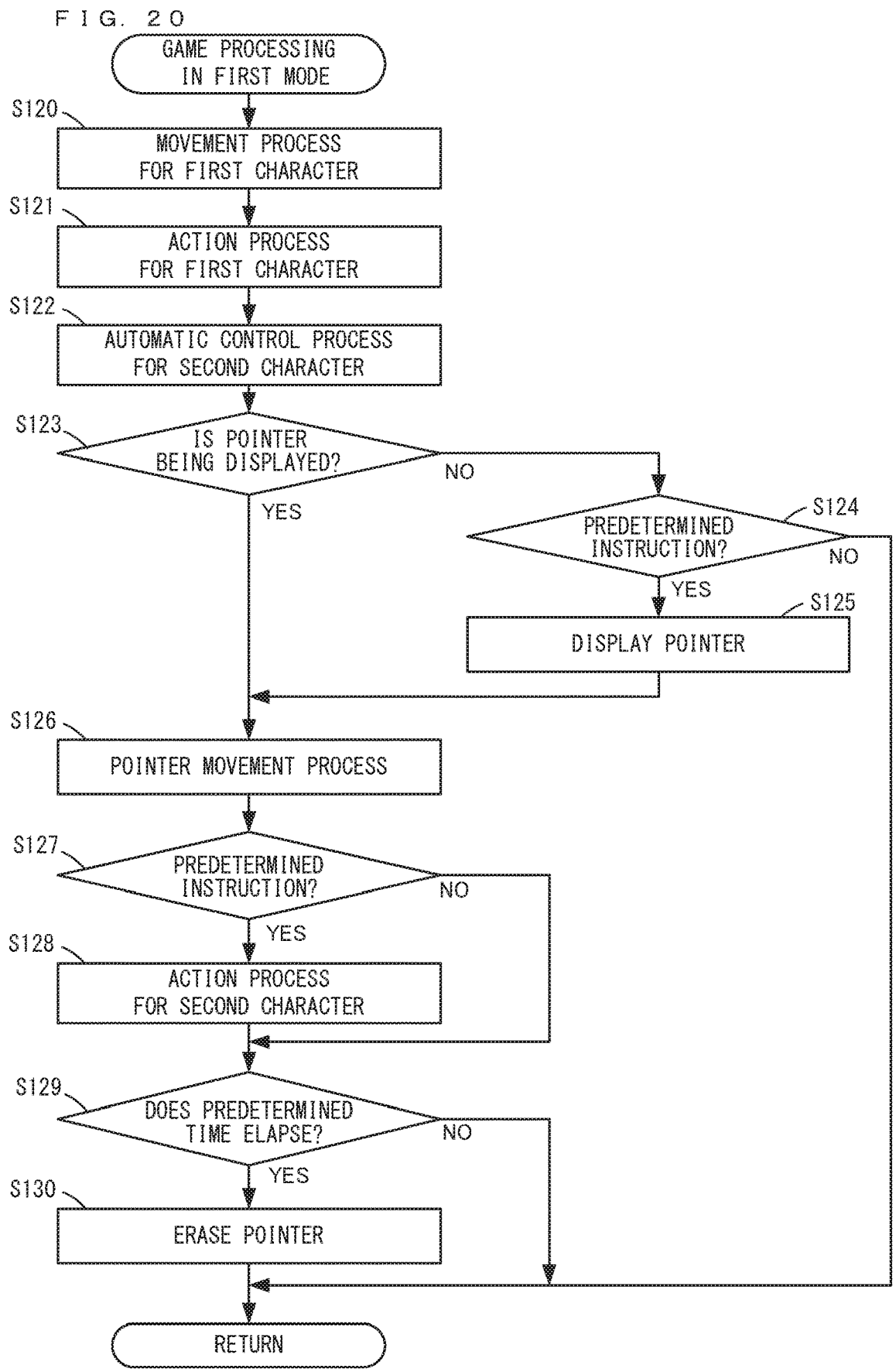
FIG. 20 is an illustrative non-limiting flow chart showing an example of game processing in the first mode in step S103.

Next, the details of the game processing in the first mode in step S103 are described. FIG. 20 is a flow chart showing an example of the game processing in the first mode in step S103.

Based on the operation data from the left controller 3, the processor 81 performs a movement process for the first character object 71 (step S120). Specifically, based on a direction input to the analog stick 32 of the left controller 3, the processor 81 moves the first character object 71 in the virtual space. It should be noted that if an item object 78 is present at the position to which the first character object 71 has moved, the processor 81 causes the first character object 71 to acquire the item object 78. Further, if an enemy character 76 is present at the position to which the first character object 71 has moved, the processor 81 reduces the physical strength value of the first character object 71. Further, in accordance with the movement of the first character object 71, the processor 81 also moves the virtual camera in the virtual space. The position of the first character object 71 after the movement is stored as first character data in the memory.

Next, based on the operation data from the right controller 4, the processor 81 performs an action process for the first character object 71 (step S121). Specifically, if the buttons 53 to 56 of the right controller 4 are pressed, the processor 81 causes the first character object 71 to perform an action corresponding to the pressing of the buttons. For example, if the button 53 of the right controller 4 is pressed, the processor 81 causes the first character object 71 to jump in the virtual space. Further, for example, if the button 56 of the right controller 4 is pressed, the processor 81 causes the first character object 71 to perform an attack action. If an enemy character 76 is present within a predetermined range from the position of the first character object 71, the enemy character 76 is attacked by the attack action of the first character object 71. Consequently, the physical strength value of the enemy character 76 is reduced.

Subsequently to step S121, the processor 81 performs an automatic control process for the second character object 72 (step S122). Here, without an instruction from the first player, the second character object 72 is automatically controlled by the processor 81. The automatic control of the second character object 72 differs depending on which of the first mode A to the first mode C is set. For example, the second character object 72 is automatically moved within a predetermined range including the position of the first character object 71, but the movement range of the second character object 72 differs among the first mode A to the first mode C. Further, based on which of the first mode A to the first mode C is set, the second character object 72 automatically attacks an enemy character 76 or acquires an item object 78. For example, if the first mode A or the first mode B is set, the second character object 72 attacks an enemy character 76 present within a predetermined range from the position of the first character object 71. The second character object 72 may preferentially attack an enemy character 76 close to the second character object 72, or may preferentially attack an enemy character 76 close to the first character object 71. Further, the processor 81 may randomly select any of a plurality of attack actions as an attack action of the second character object 72, or may select any of a plurality of attack actions in accordance with the type of an enemy character 76. Further, the type of an attack action may differ in accordance with the type of an item owned by the second character object 72 (or the first character object 71). Further, if the first mode A or the first mode B is set, the second character object 72 automatically moves to an item object 78 present within a predetermined range from the position of the first character object 71 and acquires the item object 78. Further, the second character object 72 may preferentially acquire an item object 78 close to the second character object 72, or may preferentially acquire an item character 78 close to the first character object 71. Further, if the first mode C is set, the second character object 72 does not attack an enemy character 76 or acquire an item object 78, and automatically moves within a predetermined range from the position of the first character object 71.

Next, the processor 81 determines whether or not the pointer object 73 is being displayed (step S123). If the pointer object 73 is not being displayed (step S123: NO), based on the operation data, the processor 81 determines whether or not a predetermined instruction to display the pointer object 73 is given (e.g., the first R-button 60 of the right controller 4 is pressed) (step S124).

If the predetermined instruction is not given (step S124: NO), the processor 81 ends the processing shown in FIG. 20. If the predetermined instruction is given (step S124: YES), the processor 81 displays the pointer object 73 on the game screen (step S125).

If the process of step S125 is performed, or if the determination is YES in step S123, the processor 81 performs a pointer movement process (step S126). For example, based on inertial data from the right controller 4, the processor 81 moves the pointer object 73 in the game screen. For example, in accordance with a change in the orientation of the right controller 4, the processor 81 changes the position of the pointer object 73 on the game screen. Further, if a touch operation on the touch panel 13 is performed, the processor 81 moves the pointer object 73 to a position on the game screen corresponding to the touch position. Further, based on the position (a two-dimensional position) of the pointer object 73 on the game screen, the processor 81 calculates a position (a three-dimensional position) in the virtual space indicated by the pointer object 73. For example, the processor 81 may obtain a straight line passing through the position of the pointer object 73 on the game screen and parallel to the image capturing direction (the direction of the line of sight) of the virtual camera and calculate as the three-dimensional position the position where the straight line and the ground in the virtual space intersect each other. Position information regarding the pointer object 73 updated by the process of step S126 is stored as pointer data in the memory.

Subsequently to step S126, the processor 81 determines whether or not a predetermined instruction to cause the second character object 72 to perform a predetermined action is given (step S127). For example, the processor 81 may determine whether or not the first R-button 60 of the right controller 4 is pressed as the predetermined instruction. Further, the processor 81 may determine whether or not a touch operation on the touch panel 13 is performed as the predetermined instruction (whether or not a touch position is detected).

If the predetermined instruction is given (step S127: YES), the processor 81 performs an action process for the second character object 72 (step S128). Specifically, if a virtual object is present at the position in the virtual space indicated by the pointer object 73, the processor 81 determines the type of an action in accordance with the type of the virtual object. For example, if an enemy character 76 is present at the position in the virtual space indicated by the pointer object 73, the processor 81 determines an attack action. There may be a plurality of attack actions, and the processor 81 may select any of the plurality of attack actions. Further, the processor 81 may randomly select any attack action from among the plurality of attack actions, or may select any from among the plurality of attack actions in accordance with the type of the enemy character 76. Further, for example, if an item object 78 is present at the position in the virtual space indicated by the pointer object 73, the processor 81 determines the action of acquiring the item object 78. Further, if a virtual object is not present at the position in the virtual space indicated by the pointer object 73, the processor 81 determines a movement action. Then, the processor 81 causes the second character object 72 to perform the determined action.

If the process of step S128 is performed, or if the determination is NO in step S127, the processor 81 determines whether or not a predetermined time (e.g., 10 seconds) elapses since the process of step S128 is performed (step S129). Specifically, after the pointer object 73 is displayed in step S125, and if the second character object 72 is caused to perform an action in step S128, the time elapsed since the execution of the action is measured.

If the predetermined time elapses (step S129: YES), the processor 81 erases the pointer object 73 from the game screen (step S130). That is, the pointer object 73 is continuously displayed on the game screen from when the second character object 72 performs the predetermined action to when the predetermined time elapses. Consequently, the first player can continuously cause the second character object 72 to perform the predetermined action by continuously giving the predetermined instruction.

If the process of step S130 is executed, or if the determination is NO in step S129, or if the determination is NO in step S124, the processor 81 ends the processing shown in FIG. 20.

(Game Processing in Second Mode)

Next, the details of the game processing in the second mode in step S108 are described. FIG. 21 is a flow chart showing an example of the game processing in the second mode in step S108. A description is given below of a case where the left controller 3 is assigned to the first player (the first character object 71), and the right controller 4 is assigned to the second player (the second character object 72).

Based on the operation data from the left controller 3, the processor 81 performs a movement process for the first character object 71 (step S141). The process of step S141 is similar to the process of step S120.

Next, based on the operation data from the left controller 3, the processor 81 performs an action process for the first character object 71 (step S142). Specifically, if the buttons 33 to 36 of the left controller 3 are pressed, the processor 81 causes the first character object 71 to perform an action corresponding to the pressing of the buttons. For example, if the button 35 of the left controller 3 is pressed, the processor 81 causes the first character object 71 to jump in the virtual space. Further, in a case where an enemy character 76 is present within a predetermined range from the position of the first character object 71, and if the button 34 of the left controller 3 is pressed, the first character object 71 is caused to perform an attack action on the enemy character 76.

Next, based on the operation data from the right controller 4, the processor 81 performs a movement process for the second character object 72 (step S143). Specifically, based on a direction input to the analog stick 52 of the right controller 4, the processor 81 moves the second character object 72 in the virtual space. It should be noted that the second character object 72 is controlled not to separate by a predetermined distance or more from the first character object 71. Further, if an item object 78 is present at the position to which the second character object 72 has moved, the processor 81 causes the second character object 72 to acquire the item object 78. The position of the second character object 72 after the movement is stored as second character data in the memory.

Next, based on the operation data from the right controller 4, the processor 81 performs an action process for the second character object 72 (step S144). Specifically, if the buttons 53 to 56 of the right controller 4 are pressed, the processor 81 causes the second character object 72 to perform an action corresponding to the pressing of the buttons (attack an enemy character 76, acquire an item, or the like). As described above, the processor 81 ends the processing shown in FIG. 21.

It should be noted that the processes shown in the above flow charts are merely illustrative, and the order, and the contents of the processes may be appropriately changed.

As described above, in the game according to the exemplary embodiment, the first mode or the second mode is set. The first mode is a mode where based on operation inputs assigned to the first player (operation inputs to the left controller 3 and the right controller 4), the first player performs a one-player play game. The second mode is a mode where based on an operation input assigned to the first player (an operation input to the left controller 3) and an operation input assigned to the second player (an operation input to the right controller 4), the first player and the second player perform a multiplayer play game.

Specifically, in the first mode, based on operation inputs assigned to the first player, the first character object 71 is controlled in the virtual space (steps S120 and S121), and the pointer object 73 representing an indicated position on the game screen is controlled (step S126). That is, based on operation inputs assigned to the first player, both the first character object 71 and the pointer object 73 are controlled. In the first mode, in the virtual space, the second character object 72 is automatically controlled in accordance with the situation in the virtual space (step S122). For example, the second character object 72 is automatically controlled in accordance with the situation such as the position of the first character object 71, whether or not an enemy character 76 is present in the periphery of the second character object 72, or whether or not an item object 78 is present in the periphery of the second character object 72. Further, the virtual space may include a first area that the first character object 71 and the second character object 72 can enter, and a second area that the first character object 71 and the second character object 72 cannot enter. Then, the second character object 72 may be automatically controlled so that the second character object 72 does not enter the second area. Further, in the first mode, the second character object 72 performs a predetermined action on a position in the virtual space indicated by the pointer object 73 (step S128).

Further, in the second mode, based on an operation input assigned to the first player (an operation input to the left controller 3), the first character object 71 is controlled in the virtual space (steps S141 and S142). Further, based on an operation input assigned to the second player (an operation input to the right controller 4), the second character object 72 is controlled in the virtual space (steps S143 and S144).

Consequently, in the first mode, the first player can operate the first character object 71 and cause the second character object 72 that is automatically controlled, to perform a predetermined action. Further, the first player can control the pointer object 73 and cause the pointer object 73 to perform a predetermined action on a desired position. Thus, even in the first mode where a single player performs the game, it is possible to cause the second character object 72 to support the first character object 71 and advance the game advantageously.

Further, a switch is made to the second mode, whereby the first player can control the first character object 71, and the second player can control the second character object 72. Consequently, a plurality of players can perform the game. Since the game can be performed in both the first mode and the second mode, it is possible to operate a plurality of characters in both one-player play and multiplayer play.

Further, in the exemplary embodiment, a switch can be made to the second mode while the game is being executed in the first mode. The game can be resumed in the second mode from the state before the switch. Further, a switch can be made to the first mode while the game is being executed in the second mode, and the game can be resumed. Consequently, without ending the game, it is possible to switch the first mode where a single player performs the game and the second mode where a plurality of players perform the game.

Further, in the exemplary embodiment, in the first mode, operation inputs assigned to the first player include inertial data corresponding to outputs from the inertial sensors (114 and 115) included in a second operation device (the right controller 4). Based on the inertial data, the position of the pointer object 73 is controlled. Further, operation inputs assigned to the first player include operation data corresponding to an input to the analog stick 32 included in a first operation device (the left controller 3). Based on the operation data, the position of the first character object 71 is controlled. Consequently, the first player can control the position of the pointer object 73 by changing the orientation of the second operation device, and can relatively easily control the position of the pointer object 73 while controlling the position of the first character object 71 using the first operation device.

Further, in the exemplary embodiment, in the first mode, based on a touch input to the touch panel 13, the position of the pointer object 73 is indicated, and an instruction to perform a predetermined action is given. Consequently, it is possible to cause the second character object 72 to perform a predetermined action on a position in the virtual space corresponding to a touch position on the game screen.

Further, in the exemplary embodiment, in the first mode, if an object is present at a position in the virtual space indicated by the pointer object 73, the second character object 72 performs a predetermined action corresponding to the type of the object on the object.

For example, if an enemy character 76 is present at a position in the virtual space indicated by the pointer object 73, the second character object 72 performs an attack action on the enemy character 76. Further, if an item object 78 is present at a position in the virtual space indicated by the pointer object 73, the second character object 72 performs the operation of acquiring the item object 78.

Consequently, the first player can cause the second character object 72 to attack an enemy character 76 or acquire an item object 78, and can cause the second character object 72 to perform various actions in accordance with the presence or absence of an object or the type of an object.

Further, in the exemplary embodiment, in the first mode, the second character object 72 moves to a position in the virtual space indicated by the pointer object 73. Thus, the first player can move the second character object 72 that automatically moves, to a desired position.

Further, in the exemplary embodiment, in the first mode, in accordance with an instruction from the first player, the second character object 72 performs a predetermined action. Consequently, the first player can cause the second character object 72 to perform a predetermined action on a desired position at a desired timing.

Further, in the exemplary embodiment, in the first mode, in accordance with the position of the first character object 71, the second character object 72 automatically moves within a predetermined range in the virtual space, and in accordance with an instruction from the first player, performs a predetermined action on a position in the virtual space indicated by the pointer object 73. Consequently, by controlling the position of the first character object 71, the first player can determine the movement range of the second character object 72 to some extent, and in accordance with an instruction, cause the second character object 72 to perform a predetermined action.

(Variations)

While the game processing according to the exemplary embodiment has been described above, the exemplary embodiment is merely an example and can be modified as follows, for example.

For example, in the above exemplary embodiment, in the first mode, the first player controls the first character object 71 and the pointer object 73 using the left controller 3 and the right controller 4. Further, in the second mode, the first player controls the first character object 71 using the left controller 3, and the second player controls the second character object 72 using the right controller 4. In another exemplary embodiment, in the first mode, the control of the first character object 71 and the pointer object 73 performed using the left controller 3 and the right controller 4 may be performed using only the left controller 3 (or the right controller 4). For example, in the first mode, the position of the first character object 71 may be controlled using the analog stick 32 of the left controller 3, and the position of the pointer object 73 may be controlled by changing the orientation of the left controller 3. Further, in the first mode, in accordance with the situation in the virtual space, the second character object 72 is automatically controlled and performs a predetermined action on a position in the virtual space indicated by the pointer object 73. Further, in the second mode, the first character object 71 is controlled using the left controller 3, and the second character object 72 is controlled using the right controller 4.

Further, in the above exemplary embodiment, the pointer object 73 indicates a position on the game screen and has two-dimensional coordinate values on the game screen as position information. In another exemplary embodiment, the pointer object 73 may be placed as a three-dimensional object in the virtual space and have three-dimensional coordinate values in the virtual space as position information. That is, the pointer object 73 may be a two-dimensional object indicating a position on the game screen or a three-dimensional or two-dimensional object placed in the virtual space so long as the pointer object 73 is displayed on the game screen.

Further, in the above exemplary embodiment, in the first mode, the second character object 72 is automatically controlled in accordance with the situation in the virtual space, such as the position of the first character object 71, the position of the enemy character 76, the position of the item object 78, an area determined in advance in the virtual space, or the like. The second character object 72 may be automatically controlled in accordance with another situation in the virtual space. For example, the second character object 72 may be automatically controlled in accordance with the positional relationship between the first character object 71 and the enemy character 76, the positional relationship between the second character object 72 and the enemy character 76, the physical strength value of the enemy character 76 or the first character object 71, the positional relationship between the first character object 71 and the item object 78, the positional relationship between the second character object 72 and the item object 78, or the like.

Further, in the above exemplary embodiment, in the first mode, in accordance with an instruction from the first player, the second character object 72 is caused to perform a predetermined action. In another exemplary embodiment, without an instruction from the first player, the second character object 72 may automatically perform a predetermined action on a position in the virtual space indicated by the pointer object 73.

Further, in the above exemplary embodiment, in the first mode, based on operation inputs assigned to the first player, the first character object 71 is controlled, and the pointer object 73 is controlled. In the above exemplary embodiment, "operation inputs assigned to the first player" in the first mode are inputs to operation sections (the analog sticks and the buttons) of the left controller 3 and the right controller 4 and an input provided by changing the orientation of the right controller 4 itself. In another exemplary embodiment, "operation inputs assigned to the first player" in the first mode may be inputs to operation sections of either one of the left controller 3 and the right controller 4 and inputs based on the orientation of either one of the left controller 3 and the right controller 4, or may be inputs to operation sections of an integrated controller and inputs based on the orientation of the integrated controller.

Further, in the above exemplary embodiment, in the second mode, based on an operation input assigned to the first player, the first character object 71 is controlled, and based on an operation input assigned to the second player, the second character object 72 is controlled. In the above exemplary embodiment, "an operation input assigned to the first player" in the second mode is an input to an operation section of the left controller 3, and "an operation input assigned to the second player" in the second mode is an input to an operation section of the right controller 4. In another exemplary embodiment, "an operation input assigned to the first player" in the second mode may be an input using at least either one of the left controller 3, the right controller 4, and the integrated controller. Further, "an operation input assigned to the second player" in the second mode is an operation input different from "an operation input assigned to the first player", and may be an input using at least either one of the left controller 3, the right controller 4, and the integrated controller.

Further, in the above exemplary embodiment, as a predetermined action, the second character object 72 is caused to move, attack the enemy character 76, acquire the item object 78, or the like. The predetermined action that the second character object 72 is caused to perform is not limited to these, and may be any other action.

Further, in the above exemplary embodiment, in the first mode, if an object is present at a position in the virtual space indicated by the pointer object 73, a predetermined action is performed on the object. In another exemplary embodiment, if an object is present within a predetermined range including a position in the virtual space indicated by the pointer object 73, a predetermined action may be performed on the object.

Further, in the above exemplary embodiment, in the first mode, if an object is not present at a position in the virtual space indicated by the pointer object 73, the second character object 72 is moved to the position. In another exemplary embodiment, another action may be performed. For example, if an object is not present at a position in the virtual space indicated by the pointer object 73, an object may be caused to appear at the position.

Further, in the above exemplary embodiment, in the first mode, the pointer object 73 is controlled based on the orientation of the right controller 4 (inertial data corresponding to outputs from the inertial sensors) or a touch operation on the touch panel 13. The pointer object 73 may be controlled by another method. For example, the position of the pointer object 73 may be controlled in accordance with an input to a button or the analog stick of the left controller 3 or the right controller 4. Further, the position of the pointer object 73 may be controlled based on the orientation of the main body apparatus 2 (inertial data corresponding to outputs from inertial sensors included in the main body apparatus 2).

Further, in the above exemplary embodiment, in the first mode, in accordance with an instruction from the player while the game is executed, the game in the first mode is suspended (temporarily stopped), the first mode is switched to the second mode, and the game is resumed in the second mode. In another exemplary embodiment, the game in the first mode may not be suspended, and in accordance with an instruction from the player, the first mode may be switched to the second mode, and the game may be resumed in the second mode.

Further, in the above exemplary embodiment, in the second mode, the first player and the second player perform the game. In the second mode, three or more players may perform the game.

Further, in the above exemplary embodiment, in the first mode, a single second character object 72 that is automatically controlled is caused to appear in the virtual space. In another exemplary embodiment, in the first mode, a plurality of second character objects 72 may be caused to appear in the virtual space. In this case, if a switch is made to the second mode, the first player may control the first character object 71, and each of a plurality of players different from the first player may control each of the plurality of second character objects 72. Further, the first player may control the first character object 71, and another single player may control the plurality of second character objects 72.

Further, in the above exemplary embodiment, the first mode between the first mode and the second mode is initially set, and in accordance with an instruction from the first player, the first mode is switched to the second mode. In another exemplary embodiment, the second mode may be initially set.

Further, in the above exemplary embodiment, the above processing is performed by the main body apparatus 2 in the game system 1. Alternatively, the above processing may be executed by any other information processing apparatus (e.g., a personal computer, a smartphone, or a tablet terminal) or the like. Further, in another exemplary embodiment, for example, the above processing may be performed by a game system including a plurality of apparatuses connected together via a network such as the Internet (e.g., an information processing system including a terminal and a server).

The configurations of the exemplary embodiment described above, another exemplary embodiment, and variations related to these can be optionally combined together unless they contradict each other. Further, the above description is merely an example of the exemplary embodiment, and may be further improved and modified in various manners.

While some exemplary systems, exemplary methods, exemplary devices, and exemplary apparatuses have been described above, it is to be understood that the appended claims are not to be limited to the disclosed systems, methods, devices, and apparatuses. It goes without saying that the systems, the methods, the devices, and the apparatuses can be improved and modified in various manners without departing the spirit and scope of the appended claims.

What is claimed is:

1. A non-transitory computer-readable storage medium having stored therein a game program executed by an information processing apparatus configured to perform information processing based on an operation input assigned to each player, the game program causing a computer of the information processing apparatus to provide execution comprising:

in a first mode where a game is played based on an operation input assigned to a first player using first and second controllers:
controlling, based on the operation input assigned to the first player, a first character object in a virtual space and controlling a pointer displayed on a game screen, and automatically controlling, in the virtual space, a second character object in accordance with a situation in the virtual space and causing the second character object to perform a predetermined action on a position in the virtual space indicated by the pointer, wherein
the operation input assigned to the first player includes at least inertial data corresponding to an output from an inertial sensor in at least one of the first or second controller, and in the first mode, a position of the pointer is controlled based on the inertial data output from the inertial sensor in at least one of the first or second controller; and in a second mode where the game is played based on the operation input assigned to the first player using the first controller and an operation input assigned to a second player using the second controller:
controlling, based on the operation input assigned to the first player, the first character object in the virtual space, and controlling, based on the operation input assigned to the second player, the second character object in the virtual space.

2. The non-transitory computer-readable storage medium having stored therein the game program according to claim 1, wherein
the operation input assigned to the first player includes at least touch data corresponding to an input to a touch panel, and in the first mode, the position of the pointer is controlled based on the touch data.

3. The non-transitory computer-readable storage medium having stored therein the game program according to claim 1, wherein
the operation input assigned to the first player includes at least a first direction input, and the operation input assigned to the second player includes at least a second direction input, in the first mode, a movement of the first character object is controlled based on the first direction input, and in the second mode, the movement of the first character object is controlled based on the first direction input, and a movement of the second character object is controlled based on the second direction input.

4. The non-transitory computer-readable storage medium having stored therein the game program according to claim 1, wherein
in the first mode, if an object is present at the position in the virtual space indicated by the pointer, the second character object performs the predetermined action on the object.

5. The non-transitory computer-readable storage medium having stored therein the game program according to claim 4, wherein
the second character object performs an action that differs in accordance with a type of the object.

6. The non-transitory computer-readable storage medium having stored therein the game program according to claim 1, wherein
in the first mode, as the predetermined action, the second character object moves to the position in the virtual space indicated by the pointer.

7. The non-transitory computer-readable storage medium having stored therein the game program according to claim 1, wherein
in the first mode, in accordance with an instruction included in the operation input assigned to the first player, the second character object performs the predetermined action.

8. The non-transitory computer-readable storage medium having stored therein the game program according to claim 1, wherein
in the first mode, the second character object automatically moves within a predetermined range in the virtual space in accordance with a position of the first character object, and in accordance with an instruction included in the operation input assigned to the first player, performs the predetermined action on the position in the virtual space indicated by the pointer.

9. The non-transitory computer-readable storage medium having stored therein the game program according to claim 1, wherein
the first mode includes a plurality of first modes,
the second character object includes a degree of support based on the first mode set from the plurality of first modes, and
the second character object a degree of movement based on the first mode set from the plurality of first modes.

10. The non-transitory computer-readable storage medium having stored therein the game program according to claim 1, wherein in the first mode:
the first character object is controlled based on the operation input to an operation portion of the first controller as the first player holds the first controller in a first hand, and
the position of the pointer is controlled based on the inertial data output from the inertial sensor of the second controller as the first player holds the second controller in a second hand.

11. The non-transitory computer-readable storage medium having stored therein the game program according to claim 10, wherein the first controller is held by the first player in a first orientation and the second controller is held by the first player in the first orientation.

12. A game system, comprising:
at least one processor configured to perform information processing based on an operation input assigned to each player; and
at least one memory configured to store computer readable instructions that, when executed by the at least one processor, cause the game system to:
in a first mode where a game is played based on an operation input assigned to a first player using first and second controllers:
control, based on the operation input assigned to the first player, a first character object in a virtual space and control a pointer displayed on a game screen, and
automatically control, in the virtual space, a second character object in accordance with a situation in the virtual space and cause the second character object to perform a predetermined action on a position in the virtual space indicated by the pointer, wherein
the operation input assigned to the first player includes at least inertial data corresponding to an output from an inertial sensor in at least one of the first or second controller, and
in the first mode, a position of the pointer is controlled based on the inertial data output from the inertial sensor in at least one of the first or second controller; and
in a second mode where the game is played based on the operation input assigned to the first player using the first controller and an operation input assigned to a second player using the second controller:
control, based on the operation input assigned to the first player, the first character object in the virtual space, and
control, based on the operation input assigned to the second player, the second character object in the virtual space.

13. The game system according to claim 12, wherein
the operation input assigned to the first player includes at least touch data corresponding to an input to a touch panel, and
in the first mode, the position of the pointer is controlled based on the touch data.

14. The game system according to claim 12, wherein
the operation input assigned to the first player includes at least a first direction input, and the operation input assigned to the second player includes at least a second direction input,
in the first mode, a movement of the first character object is controlled based on the first direction input, and
in the second mode, the movement of the first character object is controlled based on the first direction input, and a movement of the second character object is controlled based on the second direction input.

15. The game system according to claim 12, wherein
in the first mode, if an object is present at the position in the virtual space indicated by the pointer, the second character object performs the predetermined action on the object, and
the second character object performs an action that differs in accordance with a type of the object.

16. The game system according to claim 12, wherein
in the first mode, as the predetermined action, the second character object moves to the position in the virtual space indicated by the pointer.

17. The game system according to claim 12, wherein
in the first mode, in accordance with an instruction included in the operation input assigned to the first player, the second character object performs the predetermined action.

18. The game system according to claim 12, wherein
in the first mode, the second character object automatically moves within a predetermined range in the virtual space in accordance with a position of the first character object, and in accordance with an instruction included in the operation input assigned to the first player, performs the predetermined action on the position in the virtual space indicated by the pointer.

19. The game system according to claim 12, wherein
in the first mode, the operation input assigned to the first player is operation inputs to the first controller and the second controller, and
in the second mode, the operation input assigned to the first player is an operation input to the first controller, and the operation input assigned to the second player is an operation input to the second controller.

20. The game system according to claim 12, wherein
in the first mode, the operation input assigned to the first player is an operation input to the first controller, and in the second mode, the operation input assigned to the first player is an operation input to the first controller, and the operation input assigned to the second player is an operation input to the second controller.

21. An information processing apparatus, comprising:
a first controller;
a second controller; and
at least one processor configured to perform information processing based on the operation input assigned to each player, the at least one processor configured to:
　in a first mode where a game is played based on an operation input assigned to a first player using the first and second controllers:
　　control, based on the operation input assigned to the first player, a first character object in a virtual space and control a pointer displayed on a game screen, and
　　automatically control, in the virtual space, a second character object in accordance with a situation in the virtual space and cause the second character object to perform a predetermined action on a position in the virtual space indicated by the pointer, wherein
　　　the operation input assigned to the first player includes at least inertial data corresponding to an output from an inertial sensor in at least one of the first or second controller, and
　　　in the first mode, a position of the pointer is controlled based on the inertial data output from the inertial sensor in at least one of the first or second controller; and
　in a second mode where the game is played based on the operation input assigned to the first player using the first controller and an operation input assigned to a second player using the second controller:
　　control, based on the operation input assigned to the first player, the first character object in the virtual space, and
　　control, based on the operation input assigned to the second player, the second character object in the virtual space.

22. An information processing method performed by an information processing system including at least one processor, the method comprising:
　in a first mode where a game is played based on an operation input assigned to a first player using first and second controllers:
　　controlling, based on the operation input assigned to the first player, a first character object in a virtual space and controlling a pointer displayed on a game screen, and
　　automatically controlling, in the virtual space, a second character object in accordance with a situation in the virtual space and causing the second character object to perform a predetermined action on a position in the virtual space indicated by the pointer, wherein
　　　the operation input assigned to the first player includes at least inertial data corresponding to an output from an inertial sensor in at least one of the first or second controller, and
　　　in the first mode, a position of the pointer is controlled based on the inertial data output from the inertial sensor in at least one of the first or second controller; and
　in a second mode where the game is played based on the operation input assigned to the first player using the first controller and an operation input assigned to a second player using the second controller:
　　controlling, based on the operation input assigned to the first player, the first character object in the virtual space, and
　　controlling, based on the operation input assigned to the second player, the second character object in the virtual space.

* * * * *